US 8,504,354 B2

(12) United States Patent
Quirk et al.

(10) Patent No.: US 8,504,354 B2
(45) Date of Patent: Aug. 6, 2013

(54) PARALLEL FRAGMENT EXTRACTION FROM NOISY PARALLEL CORPORA

(75) Inventors: Christopher B. Quirk, Seattle, WA (US); Raghavendra U. Udupa, Karnataka (IN)

(73) Assignee: Microsoft Corporation, Redmond, WA (US)

( * ) Notice: Subject to any disclaimer, the term of this patent is extended or adjusted under 35 U.S.C. 154(b) by 1217 days.

(21) Appl. No.: 12/131,144

(22) Filed: Jun. 2, 2008

(65) Prior Publication Data

US 2009/0299729 A1 Dec. 3, 2009

(51) Int. Cl.
*G06F 17/28* (2006.01)
*G06F 17/20* (2006.01)
*G06F 17/27* (2006.01)

(52) U.S. Cl.
USPC .................................. 704/8; 704/2; 704/9

(58) Field of Classification Search
None
See application file for complete search history.

(56) References Cited

U.S. PATENT DOCUMENTS

| | | | |
|---|---|---|---|
| 6,182,026 B1 | 1/2001 | Tillmann et al. | |
| 6,885,985 B2 * | 4/2005 | Hull | 704/2 |
| 7,054,803 B2 * | 5/2006 | Eisele | 704/2 |
| 7,620,539 B2 * | 11/2009 | Gaussier et al. | 704/2 |
| 7,813,918 B2 * | 10/2010 | Muslea et al. | 704/9 |
| 2003/0204400 A1 | 10/2003 | Marcu et al. | |
| 2003/0233222 A1 | 12/2003 | Soricut et al. | |
| 2004/0030551 A1 | 2/2004 | Marcu et al. | |
| 2005/0102614 A1 | 5/2005 | Brockett et al. | |
| 2005/0228643 A1 | 10/2005 | Munteanu et al. | |
| 2006/0009963 A1 | 1/2006 | Gaussier et al. | |
| 2006/0015318 A1 * | 1/2006 | Moore | 704/2 |
| 2007/0203689 A1 | 8/2007 | Wu et al. | |
| 2007/0250306 A1 | 10/2007 | Marcu et al. | |
| 2008/0010056 A1 | 1/2008 | Zhou et al. | |

OTHER PUBLICATIONS

Kumano et al. "Extracting Phrasal Alignments from Comparable Corpora by Using Joint Probability SMT Model". In Proceedings of the International Conference on Theoretical and Methodological Issues in Machine Translation, Skvde, Sweden, Sep. 2007.*
Munteanu et al. "Extracting Parallel Sub-Sentential Fragments from Non-Parallel Corpora". Proc. of the 21st Intl Conf. on Computational Linguistics, Sydney, Jul. 2006, pp. 81-88.*
Barzilay, et at "Sentence Alignment for Monolingual Comparable Corpora", Theoretical Issues in Natural Language Processing, Proceedings of the 2003 conference on Empirical methods in natural language processing, Date: 2003, pp. 9, vol. 10, 9 pages.

(Continued)

*Primary Examiner* — Jesse Pullias
(74) *Attorney, Agent, or Firm* — Microsoft Corporation

(57) ABSTRACT

Machine translation algorithms for translating between a first language and a second language are often trained using parallel fragments, comprising a first language corpus and a second language corpus comprising an element-for-element translation of the first language corpus. Such training may involve large training sets that may be extracted from large bodies of similar sources, such as databases of news articles written in the first and second languages describing similar events; however, extracted fragments may be comparatively "noisy," with extra elements inserted in each corpus. Extraction techniques may be devised that can differentiate between "bilingual" elements represented in both corpora and "monolingual" elements represented in only one corpus, and for extracting cleaner parallel fragments of bilingual elements. Such techniques may involve conditional probability determinations on one corpus with respect to the other corpus, or joint probability determinations that concurrently evaluate both corpora for bilingual elements.

20 Claims, 8 Drawing Sheets

OTHER PUBLICATIONS

Brown, et al., "Aligning Sentences in Parallel Corpora", Annual Meeting of the ACL, Proceedings of the 29th annual meeting on Association for Computational Linguistics, Date: 1991, pp. 169-176.

Fung, "A Statistical View on Bilingual Lexicon Extraction: From Parallel Corpora to Non Parallel Corpora", Lecture Notes in Computer: Science, Date: Jan. 1, 1998, vol. 1529/1998, pp. 1-17.

Moore, Robert C, "Improving IBM Word-Alignment Model 1", Annual Meeting of the ACL, Proceedings of the 42nd Annual Meeting on Association for Computational Linguistics, Date: 2004, 8 pages.

Munteanu, et al., "Improving Machine Translation. Performance by Exploiting Non-parallel Corpora", Computational Linguistics, Date: 2005, vol. 31, Issue: 4, pp. 477-504.

Brown, et al., "The Mathematics of Statistical Machine Translation: Parameter Estimation", Computational Linguistics, Date: 1993, vol. 19, Issue 2, pp. 263-311.

Cheung, et al., "Sentence Alignment in Parallel, Comparable, and Quasi Comparable Corpora", 2004, pp. 30-33.

Diab. et al., "A Statistical Word-Level Translation Model for Comparable Corpora", Date: Jun. 2000, 10 pages.

Fung, et al., "Mining Very-Nonparallel Corpora: Parallel Sentence and Lexicon Extraction via Bootstrapping and EM", 2004, 7 pages.

Fung, et al., Multi-Level Bootstrapping for Extracting Parallel Sentences from a Quasi-Comparable Corpora, International Conference on Computational Linguistics, Proceedings of the 20th international conference on Computational Linguistics, Date: 2004, 7 pages.

Fung, et al., "An IR Approach for Translating New Words from Nonparallel, Comparable Texts", International Conference on Computational Linguistics, Proceedings of the 17th international conference on Computational linguistics, Date: 1998. vol. 1, pp. 414-420.

Gaussier, et al., "A Geometric View on Bilingual Lexicon Extraction from Comparable Corpora", Annual Meeting of the ACL, Proceedings of the 42nd Annual Meeting on Association for Computational Linguistics, Date: 2004, 8 pages.

Goodman, Joshua T. "A Bit of Progress in Language Modeling", Date: Feb. 2008, pp. 1-72.

Koehn, et al., "Estimating word Translation Probabilities from Unrelated Monolingual Corpora Using the EM Algorithm", Proceedings of the Seventeenth National Conference on ArtifiCial Intelligence and Twelfth Conference on Innovative, Applications of Artificial Intelligence, Date: 2000, pp. 711-715.

Koehn, et al., "Manual and Automatic Evaluation of Machine Translation between European Languages", Date: Jun. 2006, pp. 102-121.

Koehn, et al., "Statistical Phrase-Based Translation", North American Chapter of the Association for Computational Linguistics, Proceedings of the 2003 Conference of the North American Chapter of the Association for Computational Linguistics on Human Language Technology, Date: 2003, pp. 48-54.

Koehn, Philipp, "Pharaoh: A Beam Search Decoder for Phrase-Based Statistical Machine Translation Models", Date: Feb. 15, 2008, 14 pages.

Munteanu, et al, "Extracting Parallel Sub-Sentential Fragments from Nonparallel Corpora", Annual Meeting of the ACL, Proceedings of the 21st International Conference on Computational Linguistics and the 44th annual meeting of the ACL, Date: 2006, pp. 81-88.

Och, et al., "A Systematic Comparison of Various Statistical Alignment Models", Computational Linguistics, Date: 2003, vol. 29, Issue: 1, pp. 19-51.

Och, Franz Josef, "Minimum Error Rate Training in Statistical Machine Translation", Annual Meeting of the ACL, Proceedings of the 41st Annual Meeting on Association for Computational Linguistics, Date: Jul. 2003, vol. 1, pp. 160-167.

Papineni, et al., "BLEU: A Method for Automatic Evaluation of Machine Translation", Annual Meeting of the ACL, Proceedings of the 40th Annual Meeting on Association for Computational Linguistics, Date: 2001, pp. 311-318.

Rapp, Reinhard, "Automatic Identification of Word Translations from Unrelated English and German Corpora", Annual Meeting of the ACL, Proceedings of the 37th annual meeting of the Association for Computational Linguistics on Computational Linguistics, Date: 1999, pp. 519-526.

Resnik, et al., "The Web as a Parallel Corpus", Computational Linguistics, Date: 2003, vol. 29, Issue: 3, pp. 349-380.

Shao, et al., "Mining new word translations from comparable corpora", International Conference on Computational Linguistics, Proceedings of the 20th international conference on Computational Linguistics, Date: 2004, 7 pages.

Shi, et al., "A dom tree alignment model for mining parallel data from the web", Proceedings of the 21st International Conference on Computational Linguistics and 44th Annual Meeting of the ACL, Date: Jul. 2006, pp. 489-496.

Vogel, et al., "HMM-based word alignment in statistical translation", Proceedings of the 16th conference on Computational linguistics, Date: 1996, vol. 2, pp. 836-741.

Wu, et al., "Inversion Transduction Grammar Constraints for Mining Parallel Sentences from Quasi-Comparable Corpora", Natural Language Processing—IJCNLP 2005, Date: Sep. 27, 2005, 12 pages.

Wu, Dekai, "Stochastic Inversion Transduction Grammars and Bilingual Parsing of Parallel Corpora", Date: 1997, vol. 23, Issue: 3, pp. 377-403.

Zhang, et al., "Automatic Acquisition of Chinese-English Parallel Corpus from the Web", In Proceedings of ECIR-06, 28th European Conference on Information Feetrieval, Date: Apr. 2006, 12 pages.

Zhao, et al., "Adaptive Parallel Sentences Mining from Web Bilingual News Collection", Proceedings. 2002 IEEE International Conference, Date: 2002, pp. 745-748.

Stephen E. Robertson, Steve Walker, Micheline Hancock-Beaulieu, Mike Gatford, and A. Payne. 1995. Okapi at trec-4, In Proceedings of the Text Retrieval Conference, pp. 73-86.

\* cited by examiner

110 ⟶

```
// Pseudocode for hidden Markov model calculation of monolingual/bilingual probabilities of first corpus and second corpus Element[] arrayFirstCorpus;   // element 0 is the null element for language 1
Element[] arraySecondCorpus;  // element 0 is the null element for language 2
int[] arrayAlignment;  // This array contains the index of the arraySecondCorpus element to which each arrayFirstCorpus element is aligned.

enum HMMState { Monolingual, Bilingual };

HMMState ChangeState(HMMState state) { return (state == HMMState.Monolingual ? HMMState.Bilingual : HMMState.Monolingual); }
                                                                    ⟵ 112
float[,] arrayHMMTransitionProbabilities;  // hidden Markov model for transitions float StateProbability(HMMState stateCurrent, HMMState stateLast) {
   return arrayHMMTransitionProbabilities[stateCurrent == HMMState.Monolingual ? 0 : 1, stateLast == HMMState.Monolingual ? 0 : 1];
}
                              ⟵ 114
float MonolingualProbability(Array arrayCorpus, int i) { ... }
// calculates probability of monolingually generating element i in view of the first (i-1) elements of corpus
                                                                                                    ⟵ 116
float BilingualProbability(Element elementFirstCorpus, Element[] arraySecondCorpus, out Element[] arraySecondCorpusElements) { ... }
// calculates probability of bilingually generating an element of first corpus in view of aligned elements of second corpus Array ExtractParallelFragments() {  ⟵ 120

// first, recursively compute probabilities
   Array arrayStartMonolingual = new Array().Add(HMMState.Monolingual);
   float fStartMonolingualProbability = RecursiveProbability(1, ref arrayStartMonolingual);
   Array arrayStartBilingual = new Array().Add(HMMState.Bilingual);
   float fStartBilingualProbability = RecursiveProbability(1, ref arrayStartBilingual);
   Array arrayStates = (fStartMonolingualProbability > fStartBilingualProbability ?arrayStartMonolingual : arrayStartBilingual);

// third, extract parallel fragments
   Array arrayFirstCorpusFragment = new Array();
   Array arraySecondCorpusFragment = new Array();
   Array arrayParallelFragments = new Array();

for (int j = 1; j <= arrayFirstCorpus.Length; j++) {
      if ((j == arrayFirstCorpus.Length) || (arrayStates[j + 1] == HMMState.Bilingual) {
         arrayParallelFragments.Add(new Array[] { arrayFirstCorpusFragment, arraySecondCorpusFragment });
         arrayFirstCorpusFragment.Clear();
         arraySecondCorpusFragment.Clear();
      }
      } else {
         arrayFirstCorpusFragment.Add(arrayFirstCorpus[j]);
         Array arraySecondCorpusAlignedElements;
         BilingualProbability(arrayFirstCorpus[j], arraySecondCorpus, out arraySecondCorpusAlignedElements);
         foreach (Element e in arraySecondCorpusAlignedElements)
            arraySecondCorpusFragment.Add(e);
      }
   }
   return arrayParallelFragments;
}
                                         ⟵ 122
float RecursiveProbability(int j, ref Array arrayHMMStates) {

// For a particular first corpus element j and the set of HMM states specified in arrayHMMStates (culminating with the current HMM state), calculate
   // the probability of the current state. Then recursively test both conditions (same state vs. state switch) for the next element. Finally, choose the
   // condition that leads to the highest-probability state for the rest of the first corpus, and return the current probability and states.

HMMState stateCurrent = arrayHMMStates[arrayHMMStates.Length - 1];
   HMMState stateSwitch = ChangeState(stateCurrent);

// calculate current state
   if (stateCurrent == HMMState.Monolingual)
      fCurrentProbability = MonolingualProbability(arrayFirstCorpus, j);
   else
      fCurrentProbability = BilingualProbability(arrayFirstCorpus[j], arraySecondCorpus[arrayAlignment[j]]);

// if this is not the last element in the first corpus, recursively try each state change
   if (j < arrayFirstCorpus.Length) {

Array arrayHMMStates_Same = arrayHMMStates.Clone().Add(stateCurrent);
      float fProbabilitySameState = StateProbability(stateCurrent, stateCurrent) * RecursiveProbability(j + 1, arrayHMMStates_Same);
      Array arrayHMMStates_Switch = arrayHMMStates.Clone().Add(stateSwitch);
      float fProbabilityOtherState = StateProbability(stateSwitch, stateCurrent) * RecursiveProbability(j + 1, arrayHMMStates_Switch);

// select the option having the greater probability, and remember the states that it (recursively) selected
      if (fProbabilitySameState > fProbabilityOtherState) {
         arrayHMMStates = arrayHMMStates_Same;
         fCurrentProbability *= fProbabilitySameState;
      } else {
         arrayHMMStates = arrayHMMStates_Switch;
         fCurrentProbability *= fProbabilityOtherState;
      }
   }
   return fCurrentProbability;
}
```

```
// pseudocode for recursive state search through candidate fragments beginning at element [i,j]

Element[] arrayFirstCorpus;   // element 0 is the null element for language 1
Element[] arraySecondCorpus;  // element 0 is the null element for language 2
int[] arrayAlignment;
enum HMMState { Monolingual_First, Monolingual_Second, Bilingual };

class Fragment {  // represents a candidate fragment comprising elements in FirstCorpus[i, j] and SecondCorpus[k, l]
  int i, j, k, l;
  HMMState hmmState;
}
                                                                         ⌐ 116
float MonolingualProbability(Array arrayCorpus, int i) { ... }
  // calculates probability of monolingually generating element i in view of the first (i-1) elements of corpus
                                                                                    ⌐ 118
float BilingualProbability(Array arrayFirstCorpus, int i, int j, array SecondCorpus, int k, int l) { ... }
  // calculates probability of bilingually generating elements i-j of first corpus in light of elements k-l of second corpus Array ExtractParallelFragments() {   ⌐ 182

// iterate over fragments and determine probabilities
  Array arrayBestFragments = new Array();
  RecursiveProbability(0, 0, out arrayBestFragments);

// extract parallel fragments
  Array arrayParallelFragments = new Array();
  foreach (Fragment f in arrayBestFragments) {
    if (f.Mode == HMMState.Bilingual)
      arrayParallelFragments.Add(f);
  }
  return arrayParallelFragments;
}
                                                     ⌐ 184
float RecursiveProbability(int i, int k, out arrayBestFragments) {
  Array arrayFragmentsFirstMonolingual;
  arrayBestFragments = null;
  float fBestFragmentsProbability = 0.0;

for (int j = i; j < arrayFirstCorpus.Length; j++) {  // first corpus monolingual probabilities
    float fProbabilityFirstMonolingual = MonolingualProbability(arrayFirstCorpus, j);
    if ((j == arrayFirstCorpus.Length - 1) && (i == arraySecondCorpus.Length - 1))  // no more fragments
      arrayFragments = new Array();
    else  // multiply by probability of best fragment(s) for remainder of first corpus
      fProbabilityFirstMonolingual *= RecursiveProbability(j, k, out arrayFragments);
    arrayFragments.Add(new Fragment(i, j, k, j, HMMState.Monolingual_First));
    if (fProbabilityFirstMonolingual > fBestFragmentsProbability) {
      fBestFragmentsProbability = fProbabilityFirstMonolingual;
      arrayBestFragments = arrayFragments;
    }
  } for (int l = k; l < arraySecondCorpus.Length; l++)  // second corpus monolingual probabilities
    float fProbabilitySecondMonolingual = MonolingualProbability(arraySecondCorpus, l);
    if ((i == arrayFirstCorpus.Length - 1) && (l == arraySecondCorpus.Length - 1))  // no more fragments
      arrayFragments = new Array();
    else  // multiply by probability of best fragment(s) for remainder of second corpus
      fProbabilitySecondMonolingual *= RecursiveProbability(i, l, out arrayFragments);
    arrayFragments.Add(new Fragment(i, j, i, l, HMMState.Monolingual_Second));
    if (fProbabilitySecondMonolingual > fBestFragmentsProbability) {
      fBestFragmentsProbability = fProbabilitySecondMonolingual;
      arrayBestFragments = arrayFragments;
    }
  } for (int j = i; j < arrayFirstCorpus.Length; j++) {  // bilingual probabilities
    for (int l = k; l < arraySecondCorpus.Length; l++) {
      float fProbabilityBilingual_FirstSecond = fProbabilityFirstMonolingual * BilingualProbability(arraySecondCorpus, k, l, arrayFirstCorpus, i, j);
      float fProbabilityBilingual_SecondFirst = fProbabilitySecondMonolingual * BilingualProbability(arrayFirstCorpus, i, j, arraySecondCorpus, k, l);
      float fBilingualProbability = Min(fProbabilityBilingual_FirstSecond, fProbabilityBilingual_SecondFirst);
      if ((j == arrayFirstCorpus.Length - 1) && (l == arraySecondCorpus.Length - 1))  // no more fragments
        arrayFragments = new Array();
      else  // multiply by probability of best fragment(s) for remainder of first and second corpus
        fBilingualProbability *= RecursiveProbability(k, l, out arrayFragmentsBilingual);
      arrayFragmentsBilingual.Add(new Fragment(i, j, k, l, HMMState.Bilingual));
      if (fProbabilityBilingual > fBestFragmentsProbability) {
        fBestFragmentsProbability = fProbabilityBilingual;
        arrayBestFragments = arrayFragmentsBilingual;
      }
    }
  }
  return fBestFragmentsProbability;
}
```

FIG. 8

PARALLEL FRAGMENT EXTRACTION FROM NOISY PARALLEL CORPORA

BACKGROUND

Machine translation techniques may be devised to translate a corpus in a first language into a corpus in a second language, where the corpora may be natural-language written documents, a programming language, a set of image descriptors (e.g., pixels) in a first image to be translated into a second image, etc. The development of such machine translation techniques often involves training a learning algorithm, such as an artificial neural network or an expert system, on corpus fragments that are specified in parallel in both the first language and the second language (e.g., an English-language sentence with a word-for-word Spanish translation of the sentence.) Once configured to evaluate such parallel fragments in an accurate manner, the learning algorithm may be able to translate new first-language corpora into second-language corpora with a high degree of accuracy and sophistication.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Parallel language fragments, while advantageously usable, may be difficult to compile from ordinary language materials, since comparatively few sentence-by-sentence or phrase-by-phrase translations may exist and be easily identified between any given first language and second language. To augment the sentence-parallel data, it may be possible to derive parallel language fragments from copious available non-parallel language sources, such as large sources of news articles in each language. In some cases, the news articles may reflect a high degree of parallelism, such as when two news articles describe the same event in different languages, or where one article is written by a bilingual author based on information in the other article. However, the parallelism of such news articles may be less than complete; even two very similar sentences may not be structured as word-for-word translations, and often one or both sentences may include words and phrases that are not present in the other sentence. As a result of this incomplete parallelism, some words and phrases in a second language sentence are not predictably derived from the first language sentence, and training algorithms utilizing such phrases as parallel fragments may be incorrectly trained.

Parallel language fragment extraction techniques may be devised that anticipate the inclusion of elements in the first corpus that are not present in the second corpus, and vice versa, and that produce parallel fragment pairs by removing elements present in one language fragment but not present in the other language fragment. For respective words of a first language fragment, the techniques may determine the probability that the element was generated from the content of the second language fragment ("bilingual" elements), or represents information in the first language fragment that is not present in the second language fragment ("monolingual" elements.) The pattern of more-probably-monolingual elements and more-probably-bilingual elements may then be assessed to determine which elements in each fragment may be removed to improve the parallelism of the fragment pair. For example, the specification of monolingual elements and bilingual elements may be treated as states in a hidden Markov model of element generation, and each language fragment may be partitioned into monolingually-generated portions and bilingually-generated portions based on a Viterbi path computation. These techniques may be applied to alter a first language fragment in view of a second language fragment; alternatively, the techniques may be jointly applied to evaluate each language fragment in view of the other language fragment. Some improvements may be also be applied to such variations to improve computability and to provide earlier avoidance of unpromising avenues of parallel language fragment extraction.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 5 is an illustration of an exemplary pseudocode block comprising computer-executable instructions configured to extract parallel fragments from a first corpus in a first language and a second corpus in a second language.

FIG. 8 is an illustration of another exemplary pseudocode block comprising computer-executable instructions configured to extract parallel fragments from a first corpus in a first language and a second corpus in a second language.

DETAILED DESCRIPTION

Figure 1:
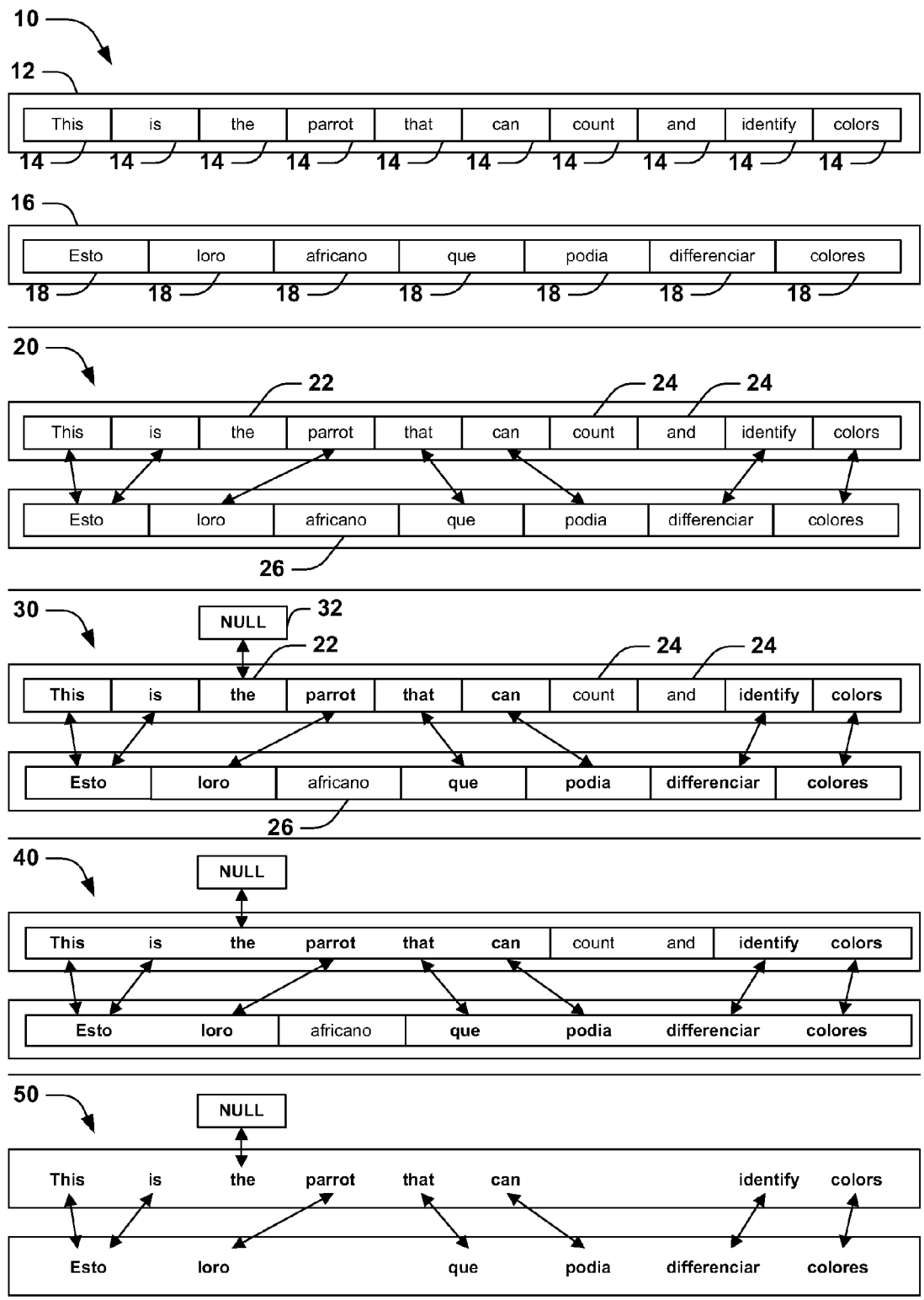
FIG. 1 is an illustration of an exemplary extraction of parallel fragments from a first corpus and a second corpus.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Machine translation techniques may be developed with a proficiency at translating from a corpus written in a first language to a second language. The corpus may comprise (e.g.) a human-readable document, such as a news article; a computer-readable document, such as a programming language; or a data set, such as an image structured according to one language (e.g., pixels in a two-dimensional image representation) and to be used as the basis for generating an image structured according to another language (e.g., voxels in a three-dimensional image representation.) Such machine translation techniques often involve the training of a learning algorithm, such as an artificial neural network, using training corpora, such as a corpus in the first language and a semantically equivalent translation of the corpus in the second language. For example, a Spanish-to-English machine translation algorithm may be trained using a set of Spanish sentences with semantically equivalent English translations. The training algorithm may therefore be trained to recognize semantically equivalent aspects of the translation between the languages, e.g., the rules for inserting the English articles "a," "an," and "the" in a target English sentence in view of the contents of the source Spanish sentence.

The training of such machine translation algorithms may involve a large body of parallel fragments, due to the complexities of many such languages, as well as the divergences between distinct languages (e.g., the formulation of heuristics to reflect the copious and often inconsistent rules of grammar of many natural languages.) However, in many cases, sufficiently large and accurate bodies of parallel fragments may not be available, especially where one or both of the languages are particularly complex or rare. In these cases, it may be helpful to generate a body of parallel fragments from available sources, which may be used in the training of machine translation algorithms or as a source of phrase translations that may be utilized in future translations. For example, bodies of similar corpora in each language may be mined for similar corpora from which parallel fragments may be extracted. As one example, a body of English-language news articles may be compared with a body of Spanish-language news articles to identify articles describing the same subject matter. Such articles may include similar facts that are likely to be expressed in each article and may give rise to parallel fragments, such as quotations by a speaker in one language that are directly translated into a second language. If the corpora are sufficiently large and similar, an automated algorithm may be utilized to generate a suitably large number of highly parallel fragments to be used to train machine translation algorithms.

However, the fragments derived in this manner may not be completely parallel, because the fragments may not have been carefully prepared with an emphasis on semantically equivalent translation. For example, an English-language sentence compared with a Spanish-language sentence may have some words arbitrarily removed that the author of the English-language sentence felt were redundant or untranslatable, and/or may have some words inserted that the author of the English-language sentence felt were helpful or implied in the Spanish-language sentence. The resulting translation, while accurately reflecting the content of the original sentence, may not be a fully parallel, semantically equivalent translation. This incomplete parallelism may present a problem for the training of machine translation algorithms, which may not be able to infer any rules for eliminating an element that has been arbitrarily omitted from a first language fragment, or for inserting an element that appears in the second language fragment but has no apparent basis in the first language fragment. As a result, the machine translation algorithm may adjust its trained parameters in reflection of the erratic translation, but in ways that diminish its accuracy in producing correct translations; e.g., if a particular training fragment pair includes an element in a source fragment that is omitted from a target fragment, the machine translation algorithm may incorporate a rule that frequently or consistently omits the element in any other translation.

In order to mitigate this problem, techniques may be devised to extract fragments from corpora that reduce the number of inconsistencies between fragments in a fragment pair. According to these techniques, the fragments of a candidate fragment pair may be viewed as a series of "bilingually" generated element sequences (which are equivalently present in the other fragment) and "monolingually" generated element sequences (which are not equivalently present in the other fragment.) The techniques may involve detecting and removing the monolingual element sequences, and if the resulting language fragments are sufficiently parallel, the fragments may be extracted as a parallel fragment for language training. In this manner, the corpora may be used to generate a cleaner set of training data that may result in more accurately trained machine translation algorithms, even if such corpora are modestly "noisy" and are not completely word-for-word translations of one another.

However, the determination of bilingual and monolingual element sequences in a fragment may be difficult, and may often depend on the context of the other elements of the fragment. For instance, in the sentence "This is a Tahitian parrot," the adjective "Tahitian" may be removed without significantly compromising the grammar of the sentence; but in the very similar sentence "This parrot is Tahitian," the removal of the same adjective results in a sentence that does not comport with the rules of English grammar. As in this example, the structuring of the fragment according to the grammar of the language may be a relevant indicator of significance. For example, the word "Tahitian" might not appear in a Spanish-language fragment of the sentence either because the word was monolingually generated with respect to the English-language sentence (and therefore the sentences are otherwise parallel), or because the sentences actually describe different facts and therefore should not be utilized as parallel fragments. Thus, the monolingual/bilingual determination of elements of the first language fragment may depend on the alignment with the elements of the second language fragment.

FIG. 1 illustrates an exemplary scenario 10 wherein parallel fragments are extracted from an English-language sentence 12 comprising English words 14 and a Spanish-language sentence 16 comprising Spanish words 18 according to a conditional probability technique. Although these sentences present similar descriptions of a parrot that can identify numbers, the English-language sentence 12 also mentions that the parrot can also count, while the Spanish-language sentence 16 also describes the parrot as an African species. Thus, the English-language sentence 12 and the Spanish-language sentence 16 are not semantically equivalent translations, but "noisy" representations of one another, each including a monolingual sequence in an otherwise related language fragment pair. Moreover, the English-language sentence 12 includes the English structural article "the" 22, which is not represented in the Spanish-language sentence.

The extraction of a parallel fragment pair from the English-language sentence 12 and the Spanish-language sentence 16 involves an aligning based on various determinations made with respect to the words of the sentences. It may be appreciated that while FIG. 1 illustrates the aligning in an ordered manner, this ordering is only for facilitating an understanding of an exemplary aligning, and that various alignment techniques may accomplish several portions of the aligning in a different ordering, including concurrently. FIG. 1 involves a matching 20 of the English words 14 to equivalent Spanish words 18. The English structural article "the" 22 does not match to an equivalent Spanish word 18 in the Spanish-language sentence 16, because the structural constraint that prompts the inclusion of the article is not included in the rules of Spanish grammar. The matching 20 also identifies words in each sentence that are not present in the other, such as the English words "count and" 24 and the Spanish word "africano" 26.

The exemplary aligning also involves determining 30 whether an unmatched element is monolingual or simply structural. Although not illustrated in FIG. 1, it may be advantageous to formulate the determination as a probability calculation, such as the probability that an unmatched word is present because its insertion is part of the translation from the other language fragment vs. the probability that an unmatched word is monolingually generated. For example, because the English article "the" 22 comports well in the context of the bilingually matched words of the English-language sentence 12, the odds may be high that this article is bilingually generated. However, because the terms "count and" 24 do not appear to be derived from the contents of the Spanish-language 16, the odds of a monolingual generation may be greater than of a bilingual generation; similarly, the term "africano" 26 may be calculated with a high probability of monolingual generation, since no equivalent term appears in the English-language sentence 12. In order to differentiate between monolingually-generated terms and structural elements (such as the English article "the" 22), the latter elements may be aligned with a special "null word" 32, which indicates that a translation of the element into the other language may exclude a translation of the structural term.

The exemplary aligning also involves identifying 40 sequences of bilingual and monolingual terms. For example, the English-language sentence 12 comprises the first six English words 14 that are bilingually aligned with the Spanish-language sentence 16; a short monolingual fragment (the terms "count and" 24), and the remaining two English words 14. The Spanish-language sentence 16 may be similarly analyzed, resulting in an identification of a one-element monolingual fragment (the word "africano" 26) surrounded by matched terms. The analysis may involve a conceptual view of the sentence as a series of words generated according to either a bilingual generation state (where the words are translated according to the content of equivalent words in the other sentence) or a monolingual generation state (where the words are inserted without regard to the content of the other sentence.) In evaluating whether a word of a sentence was monolingually or bilingually generated, the analysis may consider as relevant whether the preceding words of the sentence were generated according to a monolingual translation state or a bilingual translation state. In accordance with this concept, the odds of transitioning from a bilingual to a monolingual translation state may be calculated as a probability (e.g., "given the previous two monolingual terms ["count and" 24] and the mapped elements that follow, what are the odds that the term "identify" is monolingual and/or bilingual?"—answer: the odds favor a bilingual translation state for the term "identify.")

Finally, following the calculation of the monolingual and bilingual probabilities of the sequences, the bilingual terms may be selected and the monolingual terms may be removed or skipped. The resulting language fragment pair 50 presents considerably cleaner parallelism than the original English-language sentence 12 and Spanish-language sentence 16, and may be useful in the automated training of artificial intelligence algorithms in machine translation systems. The generating may also be performed in a manner that promotes the production of even cleaner parallel fragments, e.g., through techniques that adjust the removal of non-parallel chunks to promote compliance with grammatical correctness and semantic equivalence between the fragment pairs.

According to these principles, techniques may be devised to distinguish between bilingual parallel fragments from a first corpus and a second corpus and monolingual fragments embedded in either corpus. Moreover, such techniques may distinguish between monolingual fragments and structural elements that are inserted according to the rules of the corpus language. By extracting the bilingual fragments from each corpus (e.g., the elements of bilingual fragments of the first corpus along with the elements of the second corpus that are aligned with such elements), these techniques may achieve a desirably clean parallel fragment extraction from comparatively noisy corpora. These techniques may be applied based on one-way conditional probabilities that evaluate one corpus with respect to the other corpus, e.g., by identifying the words of the English-language sentence 12 generated bilingually with respect to the Spanish-language sentence 16, and extracting the bilingually-generated English words 14 and the aligned Spanish words 18 to form the parallel fragment. Alternatively, these techniques may be applied jointly, such that the words of the English-language sentence 12 and the words of the Spanish-language sentence 16 are concurrently evaluated for bilingual generation, which may yield an improved fit between the English words 14 and the Spanish words 18 comprising the parallel fragments extracted therefrom.

These techniques may be applied in many scenarios. As a first example, and as illustrated in FIG. 1, the first corpus and the second corpus may comprise natural languages, and these techniques may be utilized to extract parallel natural-language fragments of equivalent meaning. The extracted fragments may then be used to train machine translation algorithms to perform a natural-language translation, such as to facilitate communication between a first-language author and a second-language author, or to present a first-language reader with an accurate translation of a second-language corpus. The training may involve analysis of the parallel fragments to elucidate language structure and/or natural-language word equivalence, or to utilize the parallel fragments as a stock of acceptable translations, such as of commonly communicated phrases. Alternatively, a first-language speaker who wishes to translate to or from a second-language corpus; in this scenario, the parallel fragments may be included in a first-language-to-second-language translation aid, such as a reference guide containing commonly communicated phrases. As a second example, the first language and second language may comprise computer-readable languages (e.g., C# and Java), such as programming languages, and the techniques may be utilized to train a language translator that is capable of producing a second-programming-language program based on a first-programming-language source code and expressing the same programmatic logic. As a third example, the first language and second language may abstract languages representing similar concepts (e.g., two grammatic languages, such as Backus-Naur Form and Wirth syntax notation), and these techniques may be utilized to train an algorithm for translating similarly expressed concepts in one language into the other language. Those of ordinary art may devise many scenarios in which the techniques discussed herein may be utilized.

Figure 2:
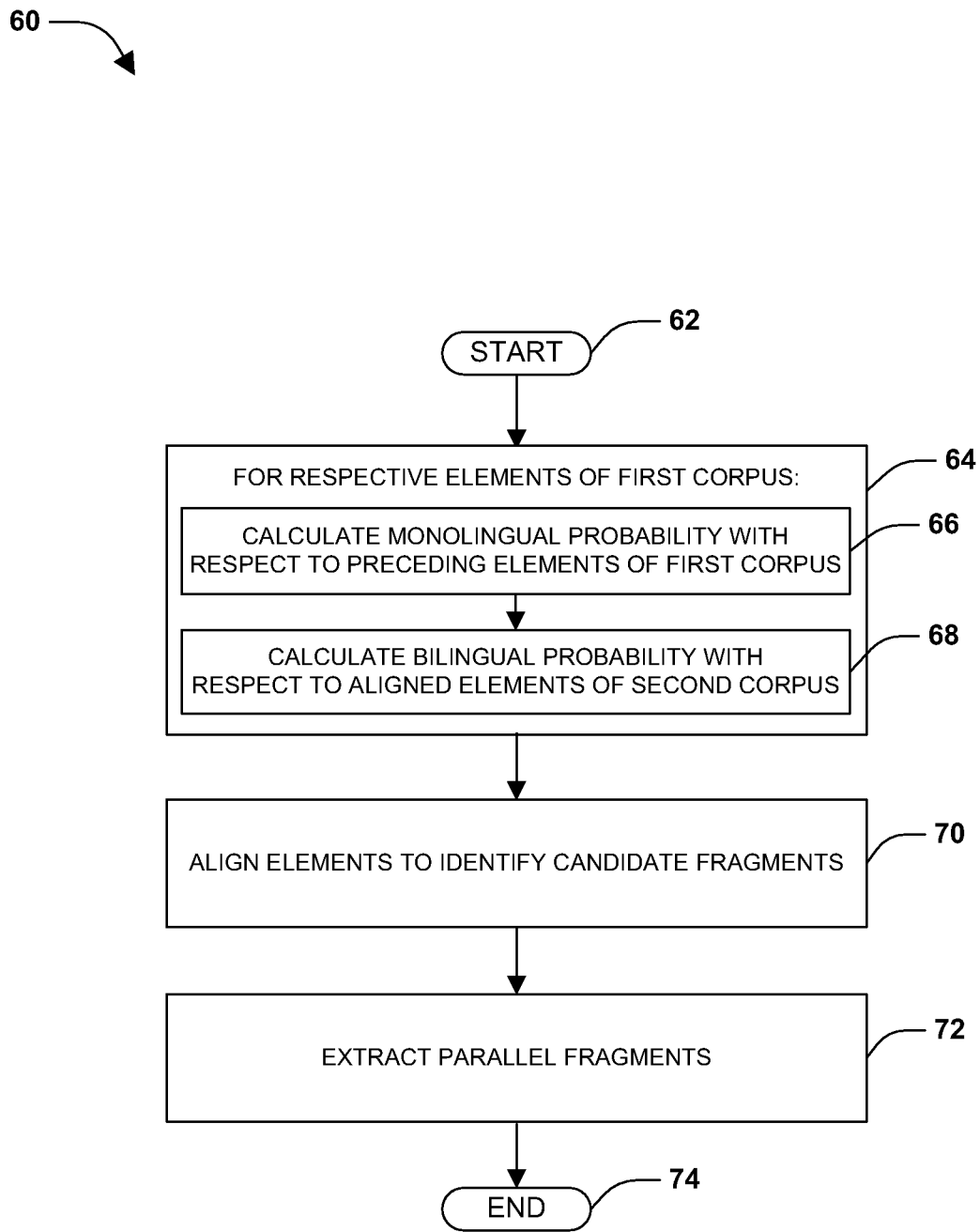
FIG. 2 is a flow chart illustrating an exemplary method of extracting parallel fragments from a first corpus in a first language and a second corpus in a second language.

FIG. 2 illustrates an exemplary conditional probability technique, comprising an exemplary method 60 of extracting parallel fragments from a first corpus in a first language and a second corpus in a second language. The exemplary method 60 begins at 62 and involves calculating 64 some probabilities for respective elements of the first corpus (e.g., by iterating across the elements of the first corpus.) The calculating 64 includes calculating 66 a monolingual probability of the element with respect to preceding elements of the first corpus, and calculating 68 a bilingual probability of the element with respect to an aligned element of the second corpus. The exemplary method 60 also involves aligning 70 the elements of the first corpus with the elements of the second corpus to identify candidate fragments comprising a sequence of first corpus elements having a greater bilingual probability than a monolingual probability. The exemplary method 60 also includes extracting 72 parallel fragments, which respectively comprise the first corpus elements of a candidate fragment and the second corpus elements aligned with the first corpus elements of the candidate fragment. Having extracted the bilingually generated elements of the first corpus and the aligned elements of the second corpus, the exemplary method 60 thereby generates parallel fragments from the comparatively noisy first corpus and second corpus, and so ends at 74.

The techniques illustrated by the exemplary method 60 of FIG. 2 may be implemented in many ways and with many variations in various aspects. Some variations may present additional advantages and/or reduce disadvantages with respect to other variations of these and other techniques. Such variations may be incorporated in various implementations of these techniques (such as the exemplary method 60 of FIG. 2), alone or in combination with other variations, and may be advantageously directed toward particular scenarios to which these techniques are applied.

A first aspect that may vary among implementations of conditional probability techniques relates to the aligning 70 of elements of the first corpus with elements of the second corpus. The aligning 70 results in a set of relationships of elements of the first corpus to elements of the second corpus, and one such alignment 20 is illustrated in FIG. 1. As noted in the discussion of FIG. 1, the aligning 70 may result in some elements of the first corpus not being aligned with an element of the second corpus, such as the English article "the" 22 in FIG. 1, which is not representable as an element in the Spanish language. The aligning may also result in the association of an element of the first corpus with multiple elements of the second corpus, or vice versa. For example, as illustrated in FIG. 1, the phrase "this is" is represented in the Spanish language as "esto," so both English words may be aligned with the single equivalent Spanish word. The aligning may also fail to associate an element of one corpus with an element of the other corpus where the element is monolingually generated.

One technique for performing this alignment involves a bilingual coincidence data set, which may generally associate elements of the first language with elements of the second language (e.g., a relationship between the English word "parrot" and the Spanish word "loro".) The bilingual coincidence data set may be devised (e.g.) as a set of probabilities, wherein two words that are identical in every context (such as "this is" and "esto") are associated with a 100% probability; two words that are never identical are associated with a 0% probability; and words that are close but imperfect translations, or that are only sometimes coincident are associated with a probability between 0% and 100%. Accordingly, embodiments of these techniques may involve preparing a bilingual coincidence data set associating elements of the first language with elements of the second language according to a bilingual coincidence. This bilingual coincidence data set may be utilized during the aligning by identifying maximally coincident elements of the second corpus according to the bilingual coincidence data set for the first corpus element and the second corpus element.

Figure 3:
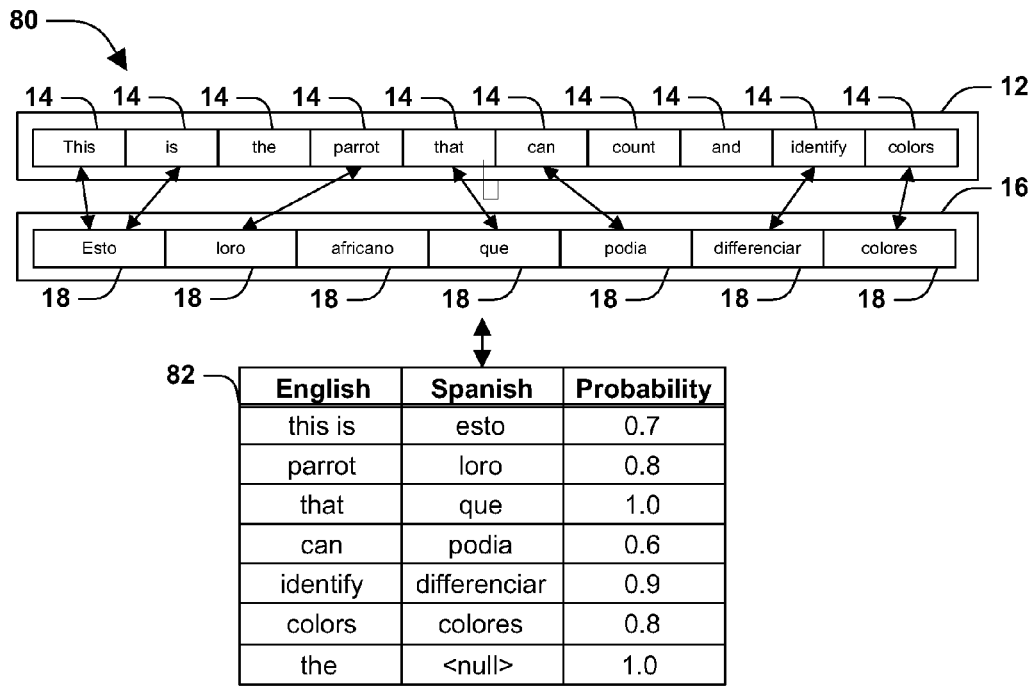
FIG. 3 is an illustration of an exemplary alignment of elements of a first corpus and a second corpus with reference to a bilingual coincidence data set.

FIG. 3 illustrates an exemplary translation 80 involving a bilingual coincidence data set 82 that associates English words to Spanish words with a coincidence probability. For example, it may be determined that the English words "that" is associated with the Spanish word "que" in 100% of accurate translations. However, with regard to the English word "parrot," in many sentences the word is literally translated to the Spanish word "loro" that references a type of bird, but in other sentences it may be used as a verb synonym for "imitate"; consequently, the "parrot"/"loro" association may be ascribed a probability of 80%. This bilingual coincidence data set 82 may be utilized in the alignment of the English words 14 of the English-language sentence 12 to the Spanish words 18 of the Spanish-language sentence 16.

Another variation of this first aspect that may vary among implementations of these techniques relates to the alignment of structural elements, such as the English article "the" in the exemplary scenario 10 of FIG. 1. Although there may not exist an element in the other corpus with which the structural element may be associated, it may be advantageous to assign an aligned association of the structural element with an element of the other corpus in order to differentiate it from a monolingually generated element, which may cause the article to be incorrectly omitted during the fragment extraction. In order to formulate this association, it may be observed that, in many cases, the structural element simply has no meaning in the other language; the semantic of the structural element may be implied by other nuances of the grammar of the second language. Thus, a corpus in the first language may include the structural element in conformity with the grammar of the first language, but the parallel translation in the second language may otherwise represent the semantic of the structural element (e.g., through element ordering or by subsuming the semantic in non-structural elements), so it may be acceptable to omit the structural element of the first corpus in the translation.

Accordingly, to each corpus may be added a "null element" that has no meaning, and the structural elements of one corpus may be associated with the null element of the other corpus. For example, the aligning 64 may result in the association of an element of the first corpus with a null element of the second language of the second corpus. During the calculation, elements aligned with the null element may be determined according to a bilingual probability (e.g., the bilingual coincidence data set 82 may include a coincident probability with respect to the null element; as illustrated in FIG. 3, the term "the" may be associated with empty Spanish output with 100% probability.) Alternatively, during the calculating, an element aligned with the null element may be calculated according to the monolingual probability of the element with respect to preceding elements of the first corpus (even though it is represented as a bilingual element.) Because the structural article has an association, it is retained during the extraction of the first language fragment, despite the absence of any coincident element in the extracted second language fragment. Those of ordinary skill in the art may be able to devise many ways of aligning the elements of the first corpus and the elements of the second corpus while implementing the techniques discussed herein.

A second aspect that may vary among implementations of conditional probability techniques relates to the manner of calculating the monolingual and bilingual probabilities of elements of the first corpus with respect to the second corpus. Many factors may be included in this calculation (e.g., the coincident probability between the element and the maximally coincident element of the second corpus, and the relative proximity or distance of the coincident elements within the respective corpora.) Accordingly, many forms of monolingual/bilingual probability calculations may be devised and applied to the techniques discussed herein.

One set of such calculations may be based on an observation that monolingually generated elements and bilingually generated elements may occur in clusters; i.e., if a one element is bilingually generated, the next one is more likely to be bilingually generated than monolingually generated, and vice versa. According to this observation, the monolingual/bilingual probability of an element may be related to the monolingual/bilingual probability of an adjacent element, such as a preceding element. This observation may be modeled by including a generation state parameter in the calculation that, for a particular element, represents the monolingual or bilingual generative mode of proximate elements, and that contributes to the probability calculation for an element a probability of monolingual or bilingual generation based on the generation mode of proximate elements. For example, the calculation may determine that a first element is bilingually generated, and may retain this observation as a bilingual generation state. The generative probability that the next (second) element in the corpus may therefore be weighted toward bilingual generation rather than monolingual generation based on the bilingual generation state of the first element.

Figure 4:
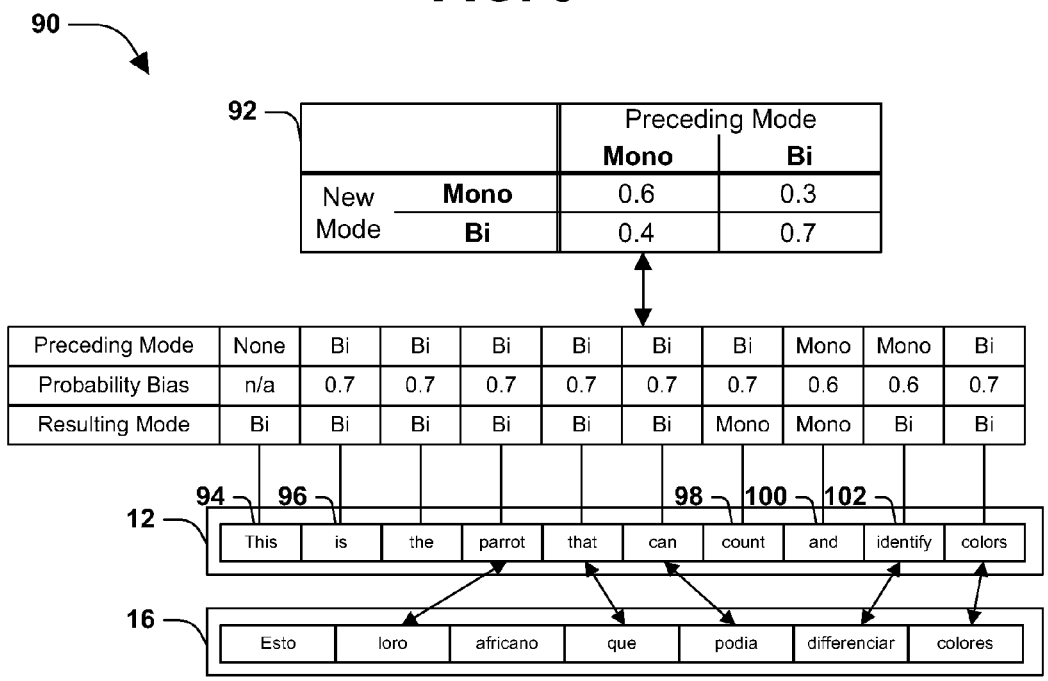
FIG. 4 is an illustration of an exemplary series of generative mode determinations based on probabilities calculated with reference to a state transition probability set.

FIG. 4 illustrates an exemplary calculation 90 that includes a state transition probability set 92, which indicates the probability that, if an element is determined to have been generated in one generative mode, the next element may be generated in the same generative mode (more likely) or the opposite generative mode (less likely.) For example, if a first element is monolingually generated, the calculation may include in the probability calculation a prediction that a second element following the first element is 60% likely to be monolingually generated, and a 40% probability of being bilingually generated. These probabilities may be included in the sequential evaluation of the generative probabilities of the elements of the English-language sentence 12. For example, the first element 94 may be determined with no prior information as to monolingual or bilingual generation, and with no probabilistic bias toward either generation mode. The probability calculation may indicate that the first element 94 was more probably bilingually generated, and this mode may be carried over into the evaluation of the second element 96, which is now probabilistically biased, with a 70% probability toward bilingual generation (determined with reference to the state transition probability set 92.) The probability calculation of the second element may support the predicted generative mode, and the selected bilingual generation mode may be retained and utilized (with continuing probabilistic bias) in the evaluation of the third element, etc. The sequential evaluation eventually reaches the seventh element 98 (the word "count"), but despite the probabilistic bias toward bilingual generation (following from the probable bilingual generation of the preceding element), the probability may be determined to be monolingually—particularly since the English word "count" is not associated with any word of the Spanish-language sentence 18, including the null element. The current state may then be stored as monolingual, which may probabilistically bias the evaluation of the eighth element 100 (the word "and") toward a monolingual generation mode. In this manner, the generative state of the translation as determined for one element may be stored and utilized in predicting the generative state of following elements.

The state transition probability set 92 illustrated in FIG. 4 may be recognized as an example of a first-order Markov model, comprising a set of states connected through transitional probabilities to other states. (The first-order nature of this hidden Markov model stems from the storage and accounting of only one state—the generative mode determined by the preceding element.) Moreover, the use of the state transition probability set 92 may be recognized as operating according to the principles of a hidden Markov model, wherein the evaluation of the generative model of an element is presumably derived from a mode (represented as a state) that is hidden from the analysis, but which may be probabilistically determined and applied to the evaluation of the following element according to the transitional probabilities represented in the state transition probability set 92. In addition, it may be appreciated by those of ordinary skill in the art that if the generative modes are represented and utilized in this manner, the determination of the monolingually and bilingually generated elements of the first corpus may be performed according to a Viterbi algorithm, comprising a selection of a sequence of state transitions having the highest probability of resulting in the sequence of monolingual and/or bilingual states represented by the first and second corpora.

In this manner, these techniques may operate based on a hidden Markov model traversed by a Viterbi algorithm to select the most probable sequence of monolingual and bilingual fragments in the first and second corpora. For example, an embodiment (such as the exemplary method 60 of FIG. 2) may involve generating a hidden Markov model representing transition probabilities between a bilingual generation mode and a monolingual generation mode, and, at the start of the evaluation, setting a transition parameter to one of a bilingual generation mode and a monolingual generation mode. The calculating of probabilities for respective elements of the first corpus may be probabilistically biased based on the value of the transition parameter, and the transition parameter may be updated to one of the bilingual generation mode and the monolingual generation mode based on the generation state of a preceding element and the hidden Markov model. For example, the probabilistic calculation of a monolingual generation mode may be derived (predominantly, or even wholly) from the transition probability between the monolingual generation state of the element and the generation state of a preceding element.

As one embodiment of these techniques that features a conditional probabilistic determination of generation between two corpora based on a first-order hidden Markov model, the bilingual probability of a first corpus with respect to a second corpus may be computed according to the mathematical formula:

$$Pr(a_1^n, t_1^n \mid s_1^m) = Pr(|t| = n) \cdot \prod_{j=1}^{m} (Pr(a_j \mid a_1^{j-1}, t_1^{j-1}, s_1^m) \cdot Pr(t_j \mid a_1^j, t_1^{j-1}, s_1^m))$$

This mathematical formula is to be understood with reference to the following notation. t represents the first corpus, and $t_x$ represents the element of the first corpus at position x (and $t_x^y$ represents the elements of the first corpus between positions x and y.) Similarly, s represents the second corpus; $s_x$ represents the element of the second corpus at position x; and $s_x^y$ represents the elements of the second corpus between positions x and y. The sizes of the first corpus and second corpus are represented, respectively, as n and m. $a_x$ represents alignment of element x of the first corpus with at least zero elements of the second corpus, wherein an alignment of −1 indicates a monolingual generation mode, an alignment of 0 indicates an alignment with the null element of the second corpus, and an alignment greater than 0 indicates an alignment with element x of the second corpus. Finally, $a_x^y$ represents alignments of elements x through y of the first corpus with elements of the second corpus.

In addition to this basic notation, $Pr(t_j|a_1^j,t_1^{j-1},s_1^m)$ in this mathematical formula represents a probability of element t of the first corpus in view of the first j−1 elements of the first corpus aligned with the elements of the second corpus. In the hidden Markov model of these techniques, this probability may be computed according to the mathematical formula:

$$Pr(t_j \mid a_1^j, t_1^{j-1}, s_1^m) = \begin{cases} e(t_j \mid t_1^{j-1}) \text{ if } a_j = -1, \\ e(t_j \mid s_{a_j}) \text{ if } a_j \neq -1 \end{cases}$$

wherein $e(t_j|t_1^{j-1})$ represents a monolingual probability of generating first corpus element $t_j$ in view of first corpus elements $t_1^{j-1}$, and $e(t_j|s_{a_j})$ represents a bilingual probability of generating first corpus element $t_j$ in view of at least zero second corpus elements $s_{a_j}$. Thus, as defined in this mathematical formula, the probability of an element of the first corpus is either calculated bilingually on the coincident probabilities of the aligned elements of the second corpus, or calculated monolingually on the preceding (j−1) elements of the first corpus.

As further included in this mathematical formula, $Pr(a_j|a_1^{j-1},t_1^{j-1},s_1^m)$ represents a probability of alignment of element j of the first corpus with at least zero elements of the second corpus in view of the first j−1 elements of the first corpus aligned with the elements of the second corpus. This probability may be computed according to the mathematical formula:

$$Pr(a_j|a_1^{j-1},t_1^{j-1},s_1^m)=d(a_j|a_{j-1})$$

wherein $d(a_j|a_{j-1})$ represents a probability of jumping to a target position $a_j$ at source position j of the other corpus if element j−1 of the first corpus is chosen for alignment with the element of the second corpus at position $a_{j-1}$ according to the hidden Markov model. Thus, this probability is calculated in relation to the generative modes determined for the preceding element, in accordance with the first-order hidden Markov model.

These formulae may be utilized to calculate, for a particular element of the first corpus, the monolingual and bilingual probabilities of the element with respect to preceding elements of the first corpus, the aligned elements of the second corpus, and the generative mode of the preceding element in the first corpus (e.g., which may be stored as a transition parameter, and may be calculated with reference to a transitional probabilities data set.) Applying this technique sequentially to the elements of the first corpus may yield a series of monolingual and bilingual probability calculations for respective elements. However, it may be appreciated that a selection of a generative mode for a particular element may be probabilistically favorable for the element, but may result in a less favorable set of probabilistic determinations for the following elements of the first corpus. Thus, for a particular element, it may be advantageous to calculate the resulting probabilities of the following elements in view of either determination for the current element. The resulting algorithm may resemble an iterative search, which may be evaluated according to a dynamic programming model Accordingly, this first set of techniques, such as illustrated by the exemplary method 60 of FIG. 2, may be implemented in many algorithms. As a first example, the calculating may be performed according to a state search algorithm, wherein the probabilities associated with the possible generative modes may be evaluated for respective elements of the first corpus. As a second example, the calculating may be performed according to a dynamic programming search, wherein candidate fragments may be identified (e.g., different phrases of elements within the first corpus) that may be evaluated to determine the more probable generative mode for the candidate fragment. This algorithm may be more complex due to the phrase-determining aspect, but may yield performance gains by evaluating the probabilities for several elements together, instead of individually evaluating each element of the first corpus. The Viterbi algorithm is a particularly applicable dynamic programming algorithm for these techniques, due to the first-order hidden Markov model representation utilized in the mathematical formulae presented herein. As a third example, a pathfinding algorithm may be applied to the generative states, such as the A* algorithm, which may seek efficient paths through the generative mode possibilities, where the distance to be minimized may be (inversely) equated with the probabilities of the generative modes for the elements of the first corpus. Those of ordinary skill in the art may apply many algorithmic approaches while implementing the techniques and formulae discussed herein.

FIG. 5 presents a pseudocode block 110 illustrating one such algorithm in which the testing of each determination is modeled as a recursive state search. It will be appreciated that this pseudocode block 110 is not limited to the syntactic or computing constraints of any particular computer language or system architecture. Rather, the pseudocode block 110 is provided as a high-level representation of how a method of rendering a data set might be implemented in a variety of languages and on a variety of computer systems by those of ordinary skill in the art in accordance with the techniques presented herein. It may be appreciated that many algorithms may be derived from this pseudocode, and that other algorithms may be otherwise devised that may not reflect the logic of this pseudocode, but that apply the techniques discussed herein to the extraction of parallel fragments from various corpora in furtherance of various scenarios.

In the pseudocode block 110 of FIG. 5, the first and second corpora are modeled as an array of Element objects, which are matched through a matching of elements according to the techniques discussed herein. The pseudocode block 110 includes a representation of a first-order Markov model as an array of probabilities 112. The pseudocode block 110 also references, but does not include in detail, a monolingual probability function 114 for calculating the monolingual probability of an element of the first corpus with respect to the preceding elements of the first corpus, and a bilingual probability function 116 for calculating the bilingual probability of an element of the first corpus with respect to the aligned elements of the second corpus. As noted previously, the monolingual probability may be determined (partly or wholly) according to the transitional probability to a monolingual generation mode in view of the generation mode of the preceding element; and the bilingual probability may be determined (partly or wholly) with reference to the coincident probabilities of the element with respect to the elements of the second corpus. The bilingual probability function 116 may also utilize a bilingual coincidence data set, such as illustrated in FIG. 3, to facilitate the computation of alignment probabilities by identifying elements of the second corpus that match the element of the first corpus with varying degrees of probable coincidence.

The pseudocode block 110 of FIG. 5 utilizes these functions and objects by performing a recursive determination of the generation modes for respective elements of the first corpus. This determination begins with the ExtractParallelFragments method 120, which first aligns the elements of the first corpus and the second corpus. The method 120 then initiates a state search, beginning with the first element of the first corpus, which invokes a recursive function 122 that tests each determination for each element of the first corpus and chooses the selection with the greater probability for the current and remaining elements of the first corpus. Having identified the most probable sequence of generative modes for the elements of the first corpus, the method 120 then assembles the elements of the first corpus into a series of monolingual and bilingual fragments. Finally, the method 120 extracts the bilingual fragments and concatenates them into an array of parallel fragments, which is provided as output.

It may be appreciated that this pseudocode, and other algorithms utilizing these techniques, may be computationally intensive. For example, if the first corpus comprises sixteen words, an exhaustively recursive algorithm may involve a nontrivial computation of probabilities for 65,536 possible generative modes. This may be undesirably taxing if the techniques are to be applied to extract parallel fragments from large first-language and second-language corpora (which may contain, e.g., thousands of documents comprising millions of sentences of each language.) This computational intensiveness may be reduced by limiting the application of the techniques to more promising fragment candidates; e.g., if a fragment candidate does not satisfy some parallel fragment conditions, it may be omitted from processing.

Accordingly, embodiments of these techniques (such as the exemplary method 60 of FIG. 2) may be configured such that the extraction of parallel fragments is limited to those that satisfy at least one parallel fragment condition. As a first example, a parallel fragment condition may be imposed that selects only candidate fragments having at least three elements of the first corpus. As a second example, a parallel fragment condition may be imposed that selects only candidate fragments having fewer than 30% of the first corpus elements and/or second corpus elements aligned with the null element of the other corpus language. As a third example, a parallel fragment condition may be imposed that selects only candidate fragments having fewer than 70% of the first corpus elements and/or second corpus elements comprising structural elements of the corpus language (e.g., articles, conjunctions, and punctuation elements), even if such structural elements are aligned with the null element of the other language. By imposing one or more of these and other parallel fragment conditions on the candidate fragments selected for evaluation and extraction, the algorithms embodying these techniques may be restricted to focusing on candidate fragments that likely have significant training value, and may therefore utilize fewer computational resources while processing a large body of corpora. Those of ordinary skill in the art may be able to devise many parallel fragment conditions and other performance improvements while designing and utilizing algorithms that implement the techniques discussed herein.

A different consideration relates to the quality of the parallel fragments generated by this first set of techniques. The parallel fragments so generated are likely to be cleaner than those generated by noise-insensitive extraction techniques (which may contain monolingually generated elements in either or both fragments of the parallel corpus), and those generated solely through element alignment (which may omit the structural elements that are, in the techniques presented herein, aligned with the null element of the other language.) However, the analysis on which these techniques may have difficulty with some types of fragments. For example, for corpora with repeated terms, such as "the parrot ignored my attempt to parrot it" and the corresponding Spanish translation "el loro no hizo caso de mi tentative de imitarla," an evaluation of the elements of the first sentence may align both instances of the term "parrot" to the Spanish word "loro," although the verb instance may be more correctly aligned with the Spanish word "imitarla." Because the analysis in these techniques is only implemented in a one-way manner, wherein the elements of the first corpus are calculated with respect to aligned elements of the second corpus (wherever the latter elements are located in the second corpus), the alignment and probability calculations may result in misalignments that might be apparent if performed in the reverse order, i.e., by evaluating the elements of the second corpus with respect to aligned elements of the first corpus. According to these observations, higher-quality parallel fragments may be extracted if the evaluation were performed in both directions—or, even better, as a joint evaluation, wherein the elements of both corpora are concurrently evaluated to identify parallel fragments based on the contents of both corpora and the alignment thereof.

Figure 6:
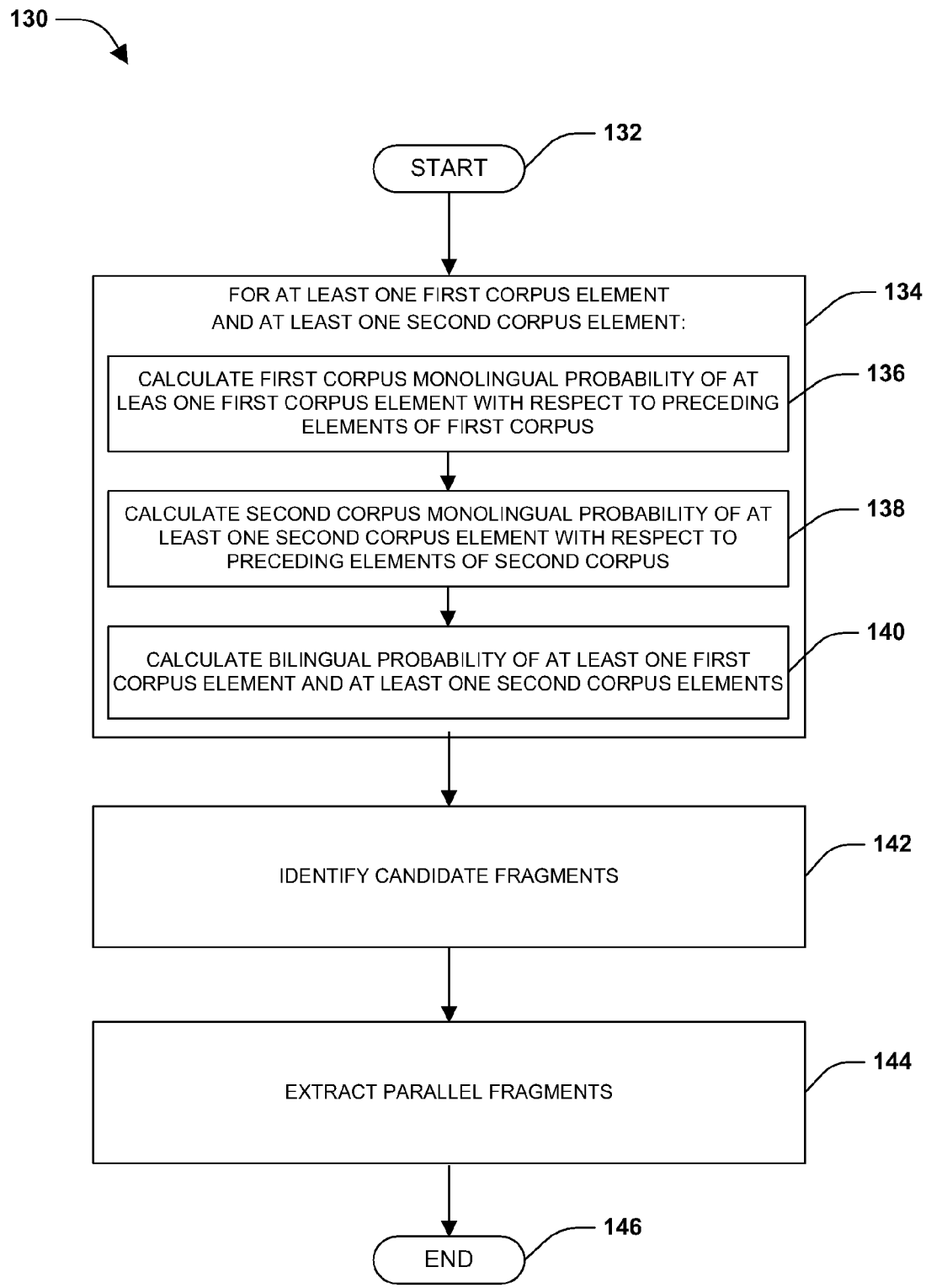
FIG. 6 is a flow chart illustrating another exemplary method of extracting parallel fragments from a first corpus in a first language and a second corpus in a second language.

FIG. 6 illustrates an exemplary method 130 of extracting parallel fragments from a first corpus in a first language and a second corpus in a second language according to a joint probability technique. The exemplary method 130 begins at 132 and involves calculating 134 some probabilities with respect to at least one first corpus element and at least one second corpus element. This calculating 134 includes a first corpus monolingual probability 136 of the at least one first corpus element with respect to preceding elements of the first corpus; a second corpus monolingual probability 138 of the at least one second corpus element with respect to preceding elements of the second corpus; and a bilingual probability 140 of the at least one first corpus elements and the at least one second corpus elements with respect to one another. The bilingual probability 140 may be determined in part, e.g., with reference to a bilingual coincidence set, such as illustrated in FIG. 3. Thus, the evaluation considers sets of elements of each corpus and identifies monolingual and bilingual fragments based on the corresponding probabilities of each set. The exemplary method 130 then involves identifying 142 candidate fragments, which comprise a sequence of first corpus elements having a greater bilingual probability than a first corpus monolingual property, and a sequence of second corpus elements aligned with the first corpus elements having a greater bilingual probability than a second corpus monolingual property. Finally, the exemplary method 130 also involves extracting 144 parallel fragments respectively comprising first corpus elements of a candidate fragment and aligned second corpus elements of the candidate fragment. Having identified and extracted sets of coincident elements of each corpus according to these probability calculations, the exemplary method 130 achieves the extraction of bilingual fragments from the first corpus and the second corpus, and so ends at 146.

Figure 7:
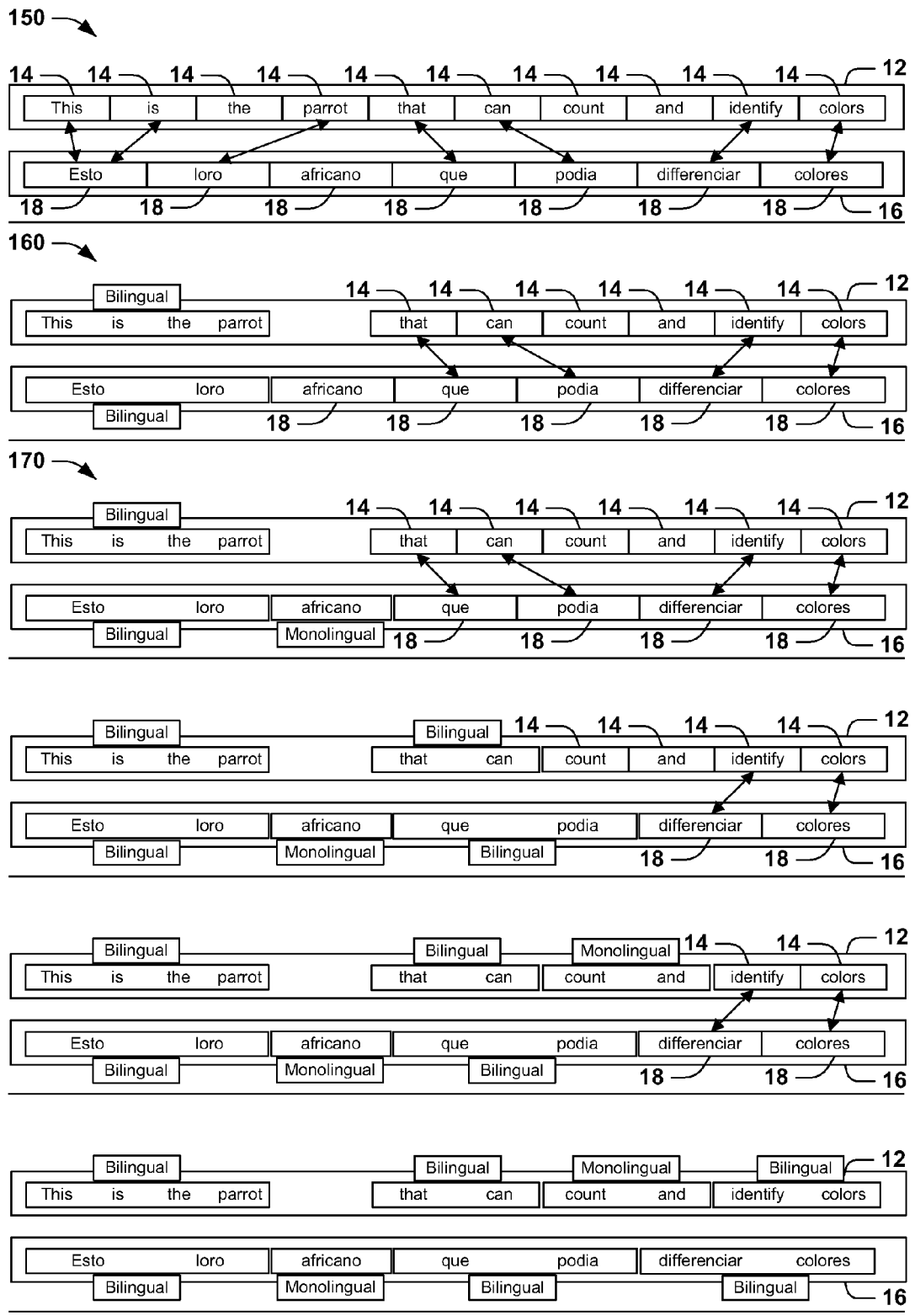
FIG. 7 is an illustration of another exemplary extraction of parallel fragments from a first corpus and a second corpus.

FIG. 7 illustrates an exemplary scenario 150 wherein the English words 14 of the English-language sentence 12 and the Spanish words 18 of the Spanish-language sentence 16 are subjected to an exemplary joint evaluation for parallel fragments. It may be appreciated that the techniques illustrated in FIG. 7 are but one type of joint evaluation, and that many other implementations of such joint are possible and may embody the principles of joint evaluation (such as illustrated in the exemplary method 130 of FIG. 6.) FIG. 7 is presented to foster an understanding of at least one type of joint evaluation that may promote a broader understanding of the many variations of joint evaluation techniques that may be devised in accordance with the techniques presented herein.

As in the exemplary scenario 10 of FIG. 1, the evaluation in FIG. 7 comprises a sequential determination of the monolingual or bilingual generative mode of respective elements. However, in contrast with the conditional probability technique illustrated in FIG. 1 that involves an evaluation of respective elements of the English-language sentence 12 (and any Spanish words 18 that may be aligned therewith), the exemplary scenario 130 of FIG. 6 illustrates a joint evaluation technique, involving a concurrent analysis of both the English-language sentence 12 and the Spanish-language sentence 16. This exemplary joint evaluation begins with an analysis of the first elements of each sentence and a determination of a monolingual fragment for some words of one sentence or a bilingual fragment for some words of both sentences. This analysis is made by calculating the monolingual and bilingual probabilities of the first words of the English-language sentence 12 and the first words of the Spanish-language sentence. A bilingual fragment may be identified for the sequences of words in each sentence that together present a high probability of bilingual generation; and a monolingual fragment may be identified for a sequence of words in either sentence that together present a high probability of monolingual generation. The first analysis in this exemplary scenario 150 yields a bilingual fragment involving the first four words of the English-language sentence 12 and the first two words of the Spanish-language sentence 16. The joint evaluation may next consider the words following each defined fragment (i.e., beginning at "that" in the English-language sentence 12 and "africano" in the Spanish-language sentence 16.) The second analysis 160 may result in an identification of a Spanish monolingual fragment involving only the word "africano," which is reached because this word presents a high probability of monolingual generation (and because no bilingual fragments including the word "africano" may have a high bilingual probability.) The third analysis 170 yields a bilingual fragment comprising the English words 14 "that can" and the Spanish words 18 "que podia," which, together, present a high probability of bilingual generation. This sequential evaluation of both sentences continues until all words in both sentences have been selected as either a monolingual fragment or a bilingual fragment, and may be followed by the extraction of the bilingual fragments to produce parallel fragments from the English-language sentence 12 and the Spanish-language sentence 16.

The joint evaluation techniques illustrated in the exemplary method 130 of FIG. 6 and the exemplary scenario 150 of FIG. 7 may be implemented in many ways and with many variations in various aspects. Some variations may present additional advantages and/or reduce disadvantages with respect to other variations of these and other techniques. Such variations may be incorporated in various implementations of these techniques (such as the exemplary method 150 of FIG. 6), alone or in combination with other variations, and may be advantageously directed toward particular scenarios to which these techniques are applied.

It may be appreciated that many of the aspects and variations described with reference to the conditional probability techniques (such as the exemplary method 60 of FIG. 2) may also be compatible with joint probability techniques (such as the exemplary method 130 of FIG. 6.) A first such aspect involves an aligning 134 that includes a null element represented in the language of each corpus for alignment with structural elements in the other corpus that are not representable in translation. For example, for respective elements of one corpus, the aligning may involve identifying maximally coincident elements of the other corpus, and upon identifying in one corpus a structural element of the first language that is not translatable into the language of the other corpus, aligning the structural element with a null element of the language of the other corpus. Moreover, the calculating 136 for fragment candidates including an element aligned with the null element may involve calculating the monolingual probability of the element with respect to preceding elements of the corpus containing the element. Those of ordinary skill in the art may be able to devise many techniques for aligning untranslatable structural elements while implementing the joint evaluation techniques discussed herein.

A second aspect that may vary among implementations of joint probability techniques relates to the calculation of bilingual probabilities among various elements of the first corpus and the second corpus with reference to a bilingual coincidence data set 82, such as may be prepared and utilized as illustrated in FIG. 3 and the discussion thereof. This variation may be incorporated, e.g., by including in the exemplary method 130 of FIG. 6 a preparing of a bilingual coincidence data set 82 associating elements of the first language with elements of the second language according to a bilingual coincidence, and by implementing the calculating of a bilingual probability 142 by retrieving the bilingual coincidence from the bilingual coincidence data set for the at least one first corpus element and the at least one second corpus element. Those of ordinary skill in the art may be able to devise many techniques for computing bilingual probabilities of sets of first corpus elements and second corpus elements while implementing the joint evaluation techniques discussed herein.

A third aspect that may vary among implementations relates to the manner of selecting elements to be identified as candidate fragments. One manner of selecting elements and analyzing candidate fragments involves an iterative search over possible fragments. In this algorithm, the calculating may comprise iteratively calculating a fragment probability for candidate fragments comprising at least one fragment element of at least one of the first corpus and the second corpus; and the identifying may comprise identifying a candidate fragment comprising a sequence of elements having a maximal total of fragment probabilities for the first corpus and the second corpus. The iterative search may begin with the fragments beginning with the first element of each corpus. Three types of candidate fragments may begin from this position: first corpus monolingual fragments, second corpus monolingual fragments, and bilingual fragments. Moreover, many sizes of each candidate fragment are available: if the first corpus has m elements and the second corpus has n elements, then the candidate fragments featuring the first elements of each corpus include m first-corpus monolingual fragments (having sizes 1 through m), n second-corpus monolingual fragments (having sizes 1 through n), and m*n bilingual fragments. Upon selecting any such fragment for the beginning position, the evaluation may next be applied to the portions of the corpora that exclude the elements of the identified candidate fragment. For example, if the first three elements of the first corpus and the first two elements of the second corpus are selected for a bilingual fragment, then the second analysis may apply to the corpora beginning with the fourth element of the first corpus and the third element of the second corpus. This iterative evaluation continues until all elements have been identified as belonging to a candidate fragment, and the bilingual fragments may then be identified and extracted to generate the parallel fragments of the corpora.

In view of this model, the bilingual probability of a first corpus with respect to a second corpus may be computed according to the mathematical formula:

$$\delta[j,l] = \max_{0 \le i \le j, 0 \le k \le l}$$

$$\{\delta[i,l] \cdot A[i,j], \delta[j,k] \cdot B[k,l], \delta[i,k] \cdot E[i,j,k,l]\}$$

This mathematical formula is to be understood with reference to the following notation. $\delta[j,l]$ represents the fragment probability of the best sequence of fragments beginning at element 0 of the first corpus and 0 of the second corpus and ending at element j of the first corpus and element l of the second corpus. $A[i,j]$ represents the probability of a monolingual fragment that generates elements i through j of the first corpus; $B[k,l]$ represents the probability of a monolingual fragment that generates elements k through l of the second corpus; and $E[i,j,k,l]$ represents the probability of a bilingual fragment that generates elements i through j of the first corpus and elements k through l of the second corpus with respect to one another.

As further represented in this mathematical formula, $A[i,j]$ represents the monolingual probability of monolingually generating elements i through j of the first corpus, and is calculated according to the mathematical formula:

$$A[i,j] = \prod_{x=i}^{j} L_s(s_x \mid s_1^{x-1})$$

wherein $s_x$ represents the element of the second corpus at position x; $s_x^y$ represents the elements of the second corpus between positions x and y; and $L_s$ represents the monolingual probability of element x of the first corpus in view of the first x−1 elements of the first corpus. Similarly, $B[k,l]$ represents the monolingual probability of monolingually generating elements k through l of the second corpus, and is calculated according to the mathematical formula:

$$B[k,l] = \prod_{x=k}^{l} L_t(t_x \mid t_1^{x-1})$$

wherein $t_x$ represents the element of the first corpus at position x; $t_x^y$ represents the elements of the first corpus between positions x and y; and $L_t$ represents the monolingual probability of element x of the second corpus in view of the first x−1 elements of the second corpus. Finally, $E[i,j,k,l]$ represents the bilingual probability of jointly generating elements i through j of the first corpus and elements k through l of the second corpus, and is calculated according to the mathematical formula:

$$E[i,j,k,l] = \min$$

$$\{A[i,j] \cdot D[i,j,k,l], B[k,l] \cdot C[i,j,k,l]\}$$

wherein $C[i,j,k,l]$ represents the bilingual probability of generating elements i through j of the first corpus in view of elements k through l of the second corpus, and $D[i,j,k,l]$ represents the bilingual probability of generating elements k through l of the second corpus in view of elements i through j of the first corpus. The value of $C[i,j,k,l]$ can be estimated using word based models by summing out over all alignments within that region:

$$C[i,j,k,l] = \sum_{\substack{\vec{a} \\ \text{such that } a_x \in [l,k]}} \prod_{x=i}^{j} Pr(a_x \mid a_i^{x-1}, t_k^l, s_i^{x-1}) \cdot Pr(s_x \mid a_i^x, t_k^l, s_i^{x-1})$$

The standard forward-backward algorithm can be used to efficiently compute this sum, as should be clear to one versed in the art. A similar computation can be used in the reverse direction to compute $D[i,j,k,l]$.

These mathematical formulae may be utilized to calculate, for a particular element i in the first corpus and a particular element j in the second corpus, the comparative probabilities of a first corpus monolingual fragment ending at element k, a second corpus monolingual fragment ending at element l, and a bilingual fragment ending at element k of the first corpus and element l of the second corpus. In some implementations, upon making these computations, a candidate fragment may be selected, and the remainder of the corpora may be evaluated in turn. In other implementations of this technique, several or all candidate fragments at a particular position in each corpus may be tested, and each such test may result in a probability calculation for the candidate fragment and a new state of the corpora based on the type and size of the candidate fragment so selected. Thus, some implementations of these techniques may proceed as a search through various states, each comprising the set of candidate fragments beginning at element x in the first corpus and element y in the second corpus, and each state resulting in a probability determination that may be compared with other states during the search for set of candidate fragments having the greatest probability product for all such candidates.

Such implementations may resemble a maximization problem that may be performed according to various search algorithms. For example, calculating may be performed according to a state search algorithm, wherein the probabilities associated with the possible generative modes may be evaluated for respective elements of the first corpus and the second corpus. As a second example, the calculating may be performed according to a dynamic programming search, wherein candidate fragments may be identified (e.g., different phrases of elements within the first corpus beginning with element i and the second corpus beginning at element j) that may be evaluated to determine the most probable candidate fragments for the position. As a third example, a pathfinding algorithm may be applied to the generative states, such as the A* algorithm, which may seek efficient paths through the generative mode possibilities, where the distance to be minimized may be (inversely) equated with the probabilities of the generative modes for the elements of the first corpus. Those of ordinary skill in the art may apply many algorithmic approaches while implementing the techniques and formulae discussed herein.

FIG. 8 presents a pseudocode block 180 illustrating one such algorithm in which the testing of each determination is modeled as a recursive state search. Similarly to the pseudocode block 110 of FIG. 5, this pseudocode block 180 includes references to functions (with omitted details) for an alignment function 114 for aligning the elements of the first corpus and the second corpus; a monolingual probability function 116 for calculating the monolingual probability of an element of the first corpus with respect to the preceding elements of the first corpus; and a bilingual probability function 118 for calculating the bilingual probability of an element of the first corpus with respect to the aligned elements of the second corpus. The pseudocode block 180 utilizes these functions in the ExtractParallelFragments method 182, which determines the generation modes and sizes of candidate fragments of the first and second corpora, beginning at element i of the first corpus and element j of the second corpus. Moreover, for each such determination, the remainder of the corpora is recursively analyzed through recursive invocation of the RecursiveProbability method 184, such that i and j are effectively iterated over the sizes of the first corpus and the second corpus, respectively. Having identified the most probable sequence of generative modes for the elements of the first and second corpora according to the joint probabilities of each candidate fragment, the ExtractParallelFragments method 120 extracts the bilingual fragments and concatenates them into an array of parallel fragments, which is provided as output.

Again, it may be appreciated that this pseudocode, and other algorithms utilizing these techniques, may be computationally intensive. For example, if the first corpus comprises ten elements and the second corpus comprises ten elements, the first level of recursion alone involves an evaluation of twenty candidate monolingual fragments and one hundred candidate bilingual fragments; hence, the exhaustive search of all states according to this pseudocode block 180 results in the evaluation of millions of potential candidate fragments just for these two corpora. Also, because this pseudocode is structured for illustration of the principles described herein and not for efficiency, many states are redundantly evaluated, perhaps many times.

The efficiency of implementations of joint evaluation techniques (such as the pseudocode block 180 of FIG. 8) may be greatly improved through several standard state-search optimization techniques. As a first example, evaluated states may be indexed, such as by a hashtable, and the recursive algorithm may check the index before evaluating any state to verify that the state has not already been evaluated. As a second example, unpromising search paths may be terminated early; if a particular candidate fragment is very improbable, the states that flow recursively from its consideration may be omitted from evaluation. As a third example, the states may be evaluated concurrently by multiple threads, processes, and/or processors according to various parallel task design patterns. As a fourth example, candidate fragments may be selected or discarded based on one or more candidate fragment conditions that may define properties of promising candidate fragments; e.g., candidate fragments may be omitted from consideration that exceed twelve elements from either or both corpora, or where the ratio of fragment elements derived from one corpus with respect to the other corpus is less than 0.5 or greater than 2.0. Those of ordinary skill in the art may devise many improvements in the efficiency of such search algorithms while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 9:
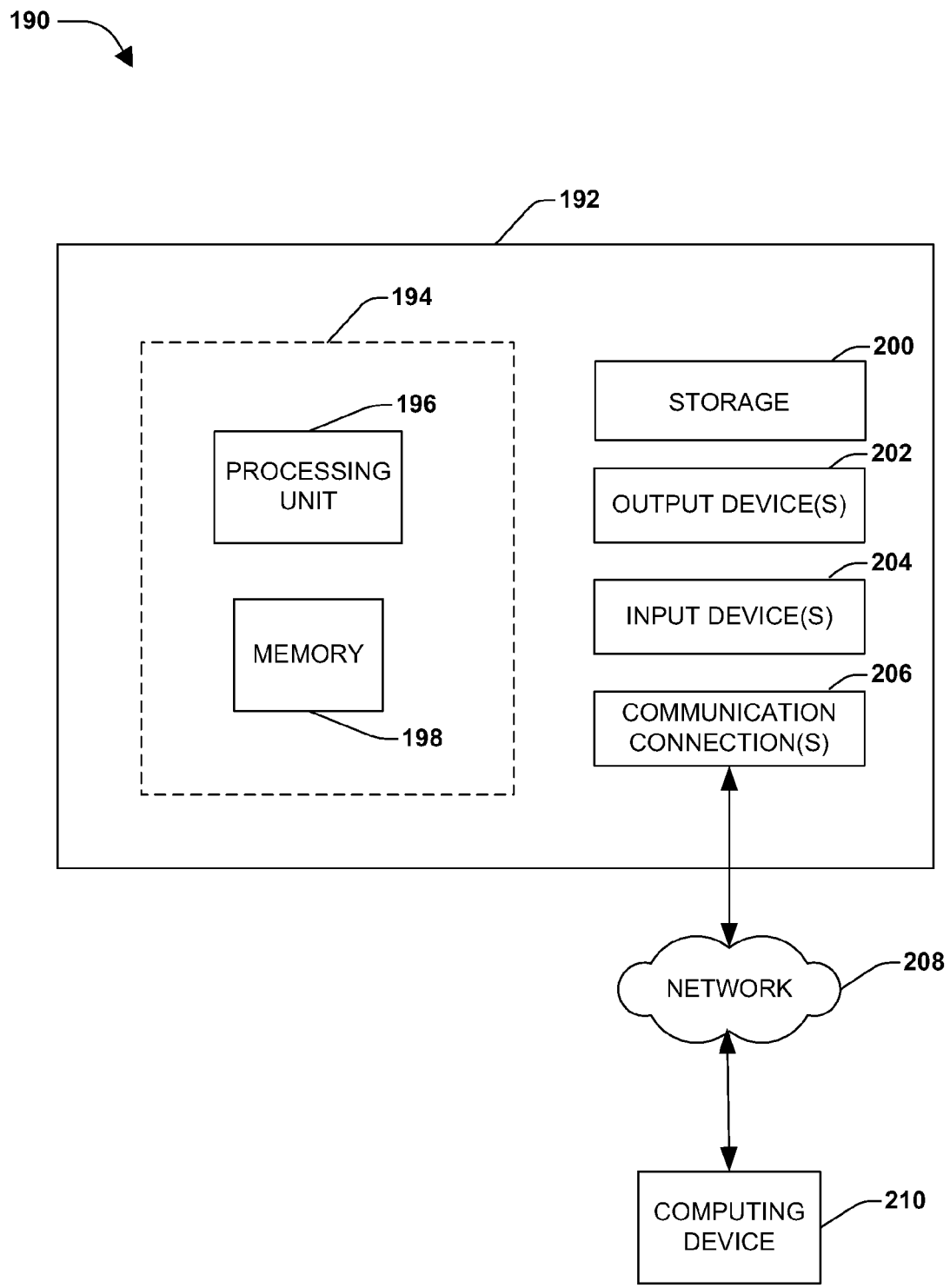
FIG. 9 illustrates an exemplary computing environment wherein one or more of the provisions set forth herein may be implemented.

FIG. 9 illustrates an example of a system 190 comprising a computing device 192 configured to implement one or more embodiments provided herein. In one configuration, computing device 192 includes at least one processing unit 196 and memory 198. Depending on the exact configuration and type of computing device, memory 198 may be volatile (such as RAM, for example), non-volatile (such as ROM, flash memory, etc., for example) or some combination of the two. This configuration is illustrated in FIG. 9 by dashed line 194.

In other embodiments, device 192 may include additional features and/or functionality. For example, device 192 may also include additional storage (e.g., removable and/or non-removable) including, but not limited to, magnetic storage, optical storage, and the like. Such additional storage is illustrated in FIG. 9 by storage 200. In one embodiment, computer readable instructions to implement one or more embodiments provided herein may be in storage 200. Storage 200 may also store other computer readable instructions to implement an operating system, an application program, and the like. Computer readable instructions may be loaded in memory 198 for execution by processing unit 196, for example.

The term "computer readable media" as used herein includes computer storage media. Computer storage media includes volatile and nonvolatile, removable and non-removable media implemented in any method or technology for storage of information such as computer readable instructions or other data. Memory 198 and storage 200 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 192. Any such computer storage media may be part of device 192.

Device 192 may also include communication connection(s) 206 that allows device 192 to communicate with other devices. Communication connection(s) 206 may include, but is not limited to, a modem, a Network Interface Card (NIC), an integrated network interface, a radio frequency transmitter/receiver, an infrared port, a USB connection, or other interfaces for connecting computing device 192 to other computing devices. Communication connection(s) 206 may include a wired connection or a wireless connection. Communication connection(s) 206 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 192 may include input device(s) 204 such as keyboard, mouse, pen, voice input device, touch input device, infrared cameras, video input devices, and/or any other input device. Output device(s) 202 such as one or more displays, speakers, printers, and/or any other output device may also be included in device 192. Input device(s) 204 and output device(s) 202 may be connected to device 192 via a wired connection, wireless connection, or any combination thereof. In one embodiment, an input device or an output device from another computing device may be used as input device(s) 204 or output device(s) 202 for computing device 192.

Components of computing device 192 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 192 may be interconnected by a network. For example, memory 198 may be comprised of multiple physical memory units located in different physical locations interconnected by a network.

Those skilled in the art will realize that storage devices utilized to store computer readable instructions may be distributed across a network. For example, a computing device 210 accessible via network 208 may store computer readable instructions to implement one or more embodiments provided herein. Computing device 192 may access computing device 210 and download a part or all of the computer readable instructions for execution. Alternatively, computing device 192 may download pieces of the computer readable instructions, as needed, or some instructions may be executed at computing device 192 and some at computing device 210.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "the" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:
1. A method of extracting parallel fragments from a first corpus in a first language and a second corpus in a second language on a computer having a processor, the method comprising:
  executing on the processor instructions configured to:
    for respective elements of the first corpus, calculate:
      a monolingual probability of the element with respect to preceding elements of the first corpus, and
      a bilingual probability of the element with respect to an aligned element of the second corpus;
    for respective elements of the first corpus, identify candidate fragments of the first corpus comprising respective elements of the first corpus having a greater bilingual probability of the element with aligned elements of the second corpus than only the monolingual probability of the element with respect to preceding elements of the first corpus to align elements of the first corpus with elements of the second corpus; and extract parallel fragments respectively comprising:
the first corpus elements of a candidate fragment, and
the second corpus elements aligned with the first corpus elements of the candidate fragment.

2. The method of claim 1:

the method comprising: preparing a bilingual coincidence data set associating elements of the first language with elements of the second language according to a bilingual coincidence; and the aligning further comprising: identifying maximally coincident elements of the second corpus according to the bilingual coincidence data set for the first corpus element and the second corpus element.

3. The method of claim 1, the aligning further comprising: upon identifying in the first corpus a structural element of the first language that is not translatable into the second language, aligning the structural element with a null element.

4. The method of claim 3, the calculating for an element aligned with the null element comprising: calculating the monolingual probability of the element with respect to preceding elements of the first corpus.

5. The method of claim 1, the identifying comprising:
generating a hidden Markov model representing transition probabilities between a bilingual generation mode and a monolingual generation mode;

setting a transition parameter to one of a bilingual generation mode and a monolingual generation mode; and for respective elements of the first corpus, updating the transition parameter comprising one of the bilingual generation mode and the monolingual generation mode based on the generation state of a preceding element and the hidden Markov model.

6. The method of claim 5, the monolingual probability calculating comprising: selecting the transition probability between the monolingual generation mode of the element and the generation mode of a preceding element.

7. The method of claim 6, the bilingual probability computed according to the mathematical formula:

$$Pr(a_1^n, t_1^n \mid s_1^m) = Pr(|t| = n) \cdot \prod_{j=1}^{m} \left( Pr(a_j \mid a_1^{j-1}, t_1^{j-1}, s_1^m) \cdot Pr(t_j \mid a_1^j, t_1^{j-1}, s_1^m) \right)$$

wherein:
t represents the first corpus;
$t_x$ represents the element of the first corpus at position x;
$t_x^y$ represents the elements of the first corpus between positions x and y;
n represents the size of the first corpus;
s represents the second corpus;
s represents the element of the second corpus at position x;
$s_x^y$ represents the elements of the second corpus between positions x and y;
m represents the size of the second corpus;
$a_x$ represents alignment of element x of the first corpus with at least zero elements of the second corpus, wherein:
an alignment of −1 indicates a monolingual generation mode,
an alignment of 0 indicates an alignment with the null element of the second corpus, and
an alignment greater than 0 indicates an alignment with element x of the second corpus;
$a_x^y$ represents alignments of elements x through y of the first corpus with elements of the second corpus;
$Pr(t_j \mid a_1^j, t_1^{j-1}, s_1^m)$ represents a probability of element t of the first corpus in view of the first j−1 elements of the first corpus aligned with the elements of the second corpus, and is computed according to the mathematical formula:

$$Pr(t_j \mid a_1^j, t_1^{j-1}, s_1^m) = \begin{cases} e(t_j \mid t_1^{j-1}) \text{ if } a_j = -1, \\ e(t_j \mid s_{a_j}) \text{ if } a_j \neq -1 \end{cases}$$

wherein:
$e(t_j \mid t_1^{j-1})$ represents a monolingual probability of generating first corpus element $t_j$ in view of first corpus elements $t_1^{j-1}$, and
$e(t_j \mid s_{a_j})$ represents a bilingual probability of generating first corpus element $t_j$ in view of at least zero second corpus elements $s_{a_j}$; and
$Pr(a_j \mid a_1^{j-1}, t_1^{j-1}, s_1^m)$ represents a probability of alignment of element j of the first corpus with at least zero elements of the second corpus in view of the first j−1 elements of the first corpus aligned with the elements of the second corpus, and is computed according to the mathematical formula:

$$Pr(a_j \mid a_1^{j-1}, t_1^{j-1}, s_1^m) = d(a_j \mid a_{j-1})$$

wherein:
represents a probability that element is translated according to $d(a_j \mid a_{j-1})$ represents a probability of jumping to a target position $a_j$ at source position j of the other corpus if element j−1 of the first corpus is chosen for alignment with the element of the second corpus at position $a_{j-1}$.

8. The method of claim 1, the calculating performed according to at least one of: a state search, a dynamic programming search, and a pathfinding search.

9. The method of claim 1, the extracting comprising:
extracting parallel fragments respectively comprising:
the first corpus elements of a candidate fragment, and
the second corpus elements aligned with the first corpus elements of the candidate fragment,
where the parallel fragment satisfies at least one parallel fragment condition.

10. The method of claim 9, the at least one parallel fragment condition comprising at least one of:
a parallel fragment length of at least three first corpus elements;
fewer than 30% of the first corpus elements and the second corpus elements aligned with the null element; and
fewer than 70% of the first corpus elements and the second corpus elements comprising a structural element.

11. The method of claim 9, the at least one parallel fragment condition comprising at least one of:
a maximum fragment size of twelve elements; and
a fragment size of one fragment with respect to the other fragment having a ratio between 0.5 and 2.0.

12. A method of extracting parallel fragments from a first corpus in a first language and a second corpus in a second language on a computer having a processor, the method comprising:
executing on the processor instructions configured to:
for at least one first corpus element and at least one second corpus element, calculate:

a first corpus monolingual probability of the at least one first corpus element with respect to preceding elements of the first corpus, and a second corpus monolingual probability of the at least one second corpus element with respect to preceding elements of the second corpus, and a bilingual probability of the at least one first corpus elements and the at least one second corpus elements with respect to one another;

align the first corpus elements and the second corpus elements to identify candidate fragments comprising:

a sequence of first corpus elements having a greater bilingual probability than only a first corpus monolingual property, and a sequence of second corpus elements aligned with the first corpus elements having a greater bilingual probability than only a second corpus monolingual property; and extract parallel fragments respectively comprising first corpus elements of a candidate fragment and aligned second corpus elements of the candidate fragment.

13. The method of claim 12, comprising: preparing a bilingual coincidence data set associating elements of the first language with elements of the second language according to a bilingual coincidence.

14. The method of claim 12, the bilingual probability calculating comprising:

retrieving the bilingual coincidence from the bilingual coincidence data set for the at least one first corpus element and the at least one second corpus element.

15. The method of claim 12, the calculating comprising: iteratively calculating a fragment probability for candidate fragments comprising at least one fragment element of at least one of the first corpus and the second corpus.

16. The method of claim 15, the identifying comprising: identifying candidate fragments comprising a sequence of elements having a maximal total of fragment probabilities for the first corpus and the second corpus.

17. The method of claim 16, the fragment sequence probability calculated according to the mathematical formula:

$$\delta[j,l] = \max_{0 \leq i \leq j, 0 \leq k \leq l} \{\delta[i,l] \cdot A[i,j], \delta[j,k] \cdot B[k,l], \delta[i,k] \cdot E[i,j,k,l]\}$$

wherein:

$\delta[j,l]$ represents the probability of the candidate sequence of fragments beginning at element 0 of the first corpus and 0 of the second corpus and ending at element j of the first corpus and element l of the second corpus;

$A[i,j]$ represents the monolingual probability of monolingually generating elements i through j of the first corpus, calculated according to the mathematical formula:

$$A[i, j] = \prod_{x=i}^{j} L_s(s_x | s_1^{x-1})$$

wherein:

$L_s$ represents the monolingual probability of element x of the first corpus in view of the first x−1 elements of the first corpus;

$s_x$ represents the element of the second corpus at position x;

$s_x^y$ represents the elements of the second corpus between positions x and y;

$B[k,l]$ represents the monolingual probability of monolingually generating elements k through l of the second corpus, calculated according to the mathematical formula:

$$B[k, l] = \prod_{x=k}^{l} L_t(t_x | t_1^{x-1})$$

wherein:

$L_t$ represents the monolingual probability of element x of the second corpus in view of the first x−1 elements of the second corpus, $t_x$ represents the element of the first corpus at position x, and $t_x^y$ represents the elements of the first corpus between positions x and y; and $E[i,j,k,l]$ represents the bilingual probability of jointly generating elements i through j of the first corpus and elements k through l of the second corpus, calculated according to the mathematical formula:

$$E[i,j,k,l] = \min\{A[i,j] \cdot D[i,j,k,l], B[k,l] \cdot C[i,j,k,l]\}$$

wherein:

$C[i,j,k,l]$ represents the bilingual probability of generating elements i through j of the first corpus in view of elements k through l of the second corpus according to a standard word-based alignment model; and $D[i,j,k,l]$ represents the bilingual probability of generating elements k through l of the second corpus in view of elements i through j of the first corpus according to a standard word-based alignment model.

18. The method of claim 16, the calculating performed according to at least one of: a state search, a dynamic programming search, and a pathfinding search.

19. The method of claim 12, the extracting comprising:

extracting parallel fragments respectively comprising:

the first corpus elements of a candidate fragment, and the second corpus elements aligned with the first corpus elements of the candidate fragment, where the parallel fragment satisfies at least one parallel fragment condition.

20. A method of extracting parallel fragments from a first corpus in a first language and a second corpus in a second language on a computer having a processor, the method comprising:

executing on the processor instructions configured to:

prepare a bilingual coincidence data set associating elements of the first language with elements of the second language according to a bilingual coincidence;

generate a hidden Markov model representing transition probabilities between a bilingual generation mode and a monolingual generation mode;

set a transition parameter to one of a bilingual generation mode and a monolingual generation mode; and align elements of the first corpus with elements of the second corpus by:

for respective elements of the first corpus, identifying maximally coincident elements of the second corpus according to the bilingual coincidence data set for the first corpus element and the second corpus element, and upon identifying in the first corpus a structural element of the first language that is not translatable into the second language, aligning the structural element with a null element;

for respective elements of the first corpus, calculating:
a monolingual probability of the element with respect to preceding elements of the first corpus, calculated with respect to the transition probability between the monolingual generation mode of the element and the generation mode of a preceding element;
for elements not aligned with the null element of the second corpus, a bilingual probability of the element with respect to an aligned element of the second corpus based on the bilingual coincidence, and calculated according to the mathematical formula:

$$Pr(a_1^n, t_1^n \mid s_1^m) = Pr(|t| = n) \cdot \prod_{j=1}^{m} (Pr(a_j \mid a_1^{j-1}, t_1^{j-1}, s_1^m) \cdot Pr(t_j \mid a_1^j, t_1^{j-1}, s_1^m))$$

wherein:
t represents the first corpus;
$t_x$ represents the element of the first corpus at position x;
$t_x^y$ represents the elements of the first corpus between positions x and y;
n represents the size of the first corpus;
s represents the second corpus;
$s_x$ represents the element of the second corpus at position x;
$s_x^y$ represents the elements of the second corpus between positions x and y;
m represents the size of the second corpus;
$a_x$ represents alignment of element x of the first corpus with at least zero elements of the second corpus, wherein:
an alignment of −1 indicates a monolingual generation mode,
an alignment of 0 indicates an alignment with the null element of the second corpus, and
an alignment greater than 0 indicates an alignment with element x of the second corpus;
$a_x^y$ represents alignments of elements x through y of the first corpus with elements of the second corpus;
$Pr(t_j \mid a_1^j, t_1^{j-1}, s_1^m)$ represents a probability of element t of the first corpus in view of the first j−1 elements of the first corpus aligned with the elements of the second corpus, and is computed according to the mathematical formula:

$$Pr(t_j \mid a_1^j, t_1^{j-1}, s_1^m) = \begin{cases} e(t_j \mid t_1^{j-1}) & \text{if } a_j = -1, \\ e(t_j \mid s_{a_j}) & \text{if } a_j \neq -1 \end{cases}$$

wherein:
$e(t_1 \mid t_1^{j-1})$ represents a monolingual probability of generating first corpus element $t_j$ in view of first corpus elements $t_1^{j-1}$, and
$e(t_j \mid s_{a_j})$ represents a bilingual probability of generating first corpus element $t_j$ in view of at least zero second corpus elements $s_{a_j}$; and
$Pr(a_j \mid a_1^{j-1}, t_1^{j-1}, s_1^m)$ represents a probability of alignment of element j of the first corpus with at least zero elements of the second corpus in view of the first j−1 elements of the first corpus aligned with the elements of the second corpus, and is computed according to the mathematical formula:

$$Pr(a_j \mid a_1^{j-1}, t_1^{j-1}, s_1^m) = d(a_j \mid a_{j-1})$$

wherein:
$d(a_j \mid a_{j-1})$ represents a probability of jumping to a target position $a_j$ at source position j of the other corpus if element j−1 of the first corpus is chosen for alignment with the element of the second corpus at position $a_{j-1}$; and
the calculating performed according to at least one of:
a state search,
a dynamic programming search, and
a pathfinding search;
identifying candidate fragments comprising a sequence of first corpus elements having a greater bilingual probability than a monolingual probability, comprising:
for respective elements of the first corpus, updating the transition parameter comprising one of the bilingual generation mode and the monolingual generation mode based on the generation state of a preceding element and the hidden Markov model; and
extracting parallel fragments respectively comprising:
the first corpus elements of a candidate fragment, and
the second corpus elements aligned with the first corpus elements of the candidate fragment,
and where the parallel fragment satisfies parallel fragment conditions comprising at least one of:
a parallel fragment length of at least three first corpus elements;
fewer than 30% of the first corpus elements and the second corpus elements aligned with the null element; and
fewer than 70% of the first corpus elements and the second corpus elements comprising a structural element.

* * * * *